US00RE39517E

(19) United States
(12) Reissued Patent
Ishihara

(10) Patent Number: US RE39,517 E
(45) Date of Reissued Patent: Mar. 13, 2007

(54) ELECTROPHOTOGRAPHIC IMAGING APPARATUS AND TONER

(75) Inventor: Toru Ishihara, Takasaki (JP)

(73) Assignee: Oki Data Corporation, Tokyo (JP)

(21) Appl. No.: 10/329,279

(22) Filed: Dec. 26, 2002

Related U.S. Patent Documents

Reissue of:
(64) Patent No.: 6,165,665
Issued: Dec. 26, 2000
Appl. No.: 09/256,358
Filed: Feb. 24, 1999

(30) Foreign Application Priority Data

Feb. 25, 1998 (JP) ..... 10-060491

(51) Int. Cl.
*G03G 9/00* (2006.01)
*G03G 15/02* (2006.01)

(52) U.S. Cl. ..... 430/110.2; 430/111.4; 399/168

(58) Field of Classification Search ..... 430/110.2, 430/111.4; 399/168
See application file for complete search history.

(56) References Cited

U.S. PATENT DOCUMENTS 4,533,617 A * 8/1985 Inoue et al. ..... 430/110.2
4,954,412 A * 9/1990 Breton et al. ..... 430/137.12
5,215,849 A * 6/1993 Makuta et al. ..... 430/108.3
5,716,748 A * 2/1998 Hasegawa et al. ..... 430/111.2

FOREIGN PATENT DOCUMENTS

| | | |
|---|---|---|
| JP | 4-182659 | 6/1992 |
| JP | 4-342264 | 11/1992 |
| JP | 5-94042 | 4/1993 |
| JP | 5-181301 | 7/1993 |
| JP | 5-224460 | 9/1993 |
| JP | 6-175466 | 6/1994 |
| JP | 7-281501 | 10/1995 |
| JP | 8-71405 | 3/1996 |
| JP | 08-076557 | 3/1996 |
| JP | 8-227171 | 3/1996 |
| JP | 8-305193 | 11/1996 |
| JP | 8-334923 | 12/1996 |
| JP | 9-34163 | 2/1997 |
| JP | 10-10838 | 1/1998 |
| JP | 10-20547 | 1/1998 |

* cited by examiner

*Primary Examiner*—Mark A. Chapman
(74) *Attorney, Agent, or Firm*—Rabin & Berdo, P.C.

(57) ABSTRACT

This invention uses a toner which has $|x| \geqq 60$, wherein a blow-off charge level is defined as x[μc/g], or a toner which has $11.0 \leqq \log \rho$, wherein a volume intrinsic electric resistivity is defined as ρ[μc/g]. Alternatively, this invention uses a capsulated toner consisting of a core and a shell resin enclosing the outer of the core, characterized in that the shell resin does not comprise a charge control agent (CCA) for controlling a charge level, but the core only comprises said CCA.

22 Claims, 17 Drawing Sheets

FIG. 8

| TONER | STRUCTURE | CCA LOADING |
|---|---|---|
| A | CAPSULE | 0.2 |
| B | CAPSULE | 0.5 |
| C | CAPSULE | 1 |
| D | CAPSULE | 1.5 |
| E | CAPSULE | 2 |
| F | SINGLE LAYER | 0.2 |
| G | SINGLE LAYER | 0.5 |
| H | SINGLE LAYER | 1 |
| I | SINGLE LAYER | 1.5 |
| J | SINGLE LAYER | 2 |

FIG. 9

DEVELOPING TOWARD BACKGROUND

| TONER | PRESENT NUMBER (25°C55%) | PRESENT NUMBER (10°C20%) |
|---|---|---|
| A | ABSENCE | ABSENCE |
| B | ABSENCE | ABSENCE |
| C | ABSENCE | ABSENCE |
| D | ABSENCE | ABSENCE |
| E | ABSENCE | ABSENCE |
| F | ABSENCE | ABSENCE |
| G | ABSENCE | ABSENCE |
| H | ABSENCE | ABSENCE |
| I | ABSENCE | AFTER 500 PRINTS |
| J | AFTER 500 PRINTS | AFTER 100 PRINTS |

FIG. 27

GLASS TRANSITION TEMPERATURE →

| | 70 | 80 | 90 | 100 | 120 |
|---|---|---|---|---|---|
| 35 | × | × | ○ | ○ | ○ |
| 40 | × | × | ○ | ○ | ○ |
| 45 | × | × | ○ | ○ | ○ |
| 50 | × | × | ○ | ○ | ○ |
| 55 | × | × | ○ | ○ | ○ |
| 60 | × | ○ | ○ | ○ | ○ |
| 65 | ○ | ○ | ○ | ○ | ○ |
| 70 | ○ | ○ | ○ | ○ | ○ |
| 75 | ○ | ○ | ○ | ○ | ○ |
| 80 | ○ | ○ | ○ | ○ | ○ |
| 85 | ○ | ○ | ○ | ○ | ○ |

← CONTACT ANGLE

○ :TONER ADHESION PRESENCE
× :TONER ADHESION ABSENCE

ELECTROPHOTOGRAPHIC IMAGING APPARATUS AND TONER

Matter enclosed in heavy brackets [ ] appears in the original patent but forms no part of this reissue specification; matter printed in italics indicates the additions made by reissue.

BACKGROUND OF THE INVENTION

This invention relates to a heat pressure-fixable capsulated toner, and an electrophotographic imaging apparatus and toner used therein.

Conventional electrophotographic printers form an electrostatic latent image by first electrifying a photoconductive insulating layer uniformly, then subjecting the layer to exposure, and dissipating the charge on the exposed portion to form the electrostatic latent image. Furthermore, it requires a developing step of depositing a fine charged powder (referred to as a toner hereinafter) onto the latent image to form a toner image, and a transferring step of transferring the resultant toner image onto paper, and a fixing step of fixing the image by heating, pressure or other suitable fixation procedure.

In general, a toner is subjected to a variety of mechanical stresses caused by rolling action of a developing roller and a toner-supplying roller during operation in a developing device, and mechanically deteriorates over a long period of operation. It has been known that the use of resins having a large molecular weight is generally useful to prevent the deterioration of the toner. However, it is necessary to heat a heat-roller to a high temperature for the satisfactory fixation of the resins onto paper. This causes some problems, such as a need for enlargement of the fixation device, curling of the paper, large energy consumption and deterioration of the fixation device.

In order to solve the problems mentioned above, a proposal has been to use a capsulated toner consisting of a core and a shelf which covers the surface of the core. This proposal intends to obtain a capsulated toner having both good fixability and good blocking resistance by a combination of making the core of easily fixable and thermally soft materials, and the outer shell made of comparatively hard material having a good blocking resistance.

Some proposals have been made on a variety of techniques using a wax having a low melting temperature such as a liquid wax and a rubber-like wax at room temperature, as a core material. Generally a hard material is selected as a shell material. When the shell material is soft and has low strength, although the fixation is improved, it would be difficult to obtain the intended toner property since the shell material would separate from the core material and the toner itself would deform due to stress caused by a developing device. When the shell material is hard and strong, a large pressure and a high temperature are required to collapse the shell, causing a bad fixation itself.

Then, a proposal has been made to use as the core material, resins having a low glass transition temperature (which will be referred to as a Tg hereinafter), which causes a blocking at a high temperature when it is used alone but improves fixation strength, and as the shell material to use a resin layer having a high Tg in order to give blocking resistance i.e. a proposal for a capsulated toner for heat-roller fixation. Usage of such toner is one effective means to achieve a fast and small apparatus with low electric power consumption.

The prior art toners above-mentioned have problems to be solved as follows.

In order to obtain a balance of good fixability and high-temperature stability in a capsulated toner, incompatibility between the shell resin and the core resin is essential. Therefore, it is necessary to use a resin for the shell that has lower electric resistance than the core, and also has a higher polarity structure than the core resin. More specifically, a capsulated toner having the advantage of stability and low-temperature fixability requires using for the shell a resin with relatively higher polarity structure than the core. However, if a resin with a high polarity structure is used, charge is easily dissipated from the surface of the charged toner particle so that it becomes disadvantage for the developing and transferring treatments. As a consequent, it is one factor that makes the design of the charge property of the toner difficult.

SUMMARY OF THE INVENTION

It is therefore a principal object of the present invention to avoid the disadvantages of the prior art.

It is another object of the present invention to provide the following inventions.

<1> An electrophotographic imaging apparatus with a one-element developing system characterized by using a toner which has $|x| \geqq 60$, wherein x is a blow-off charge level measured in μc/g.

<2> An electrophotographic imaging apparatus with a one-element developing system, characterized by using a toner which has $11.0 \leqq \log \rho$, wherein a ρ is a volume intrinsic electrical resistivity measured in μc/g.

<3> A capsulated toner consisting of a core and a shell resin enclosing the core, and having $|x| \geqq 60$.

<4> A capsulated toner consisting of a core and a shell resin enclosing the core, and having $11.0 \leqq \log \rho$.

<5> An electrophotographic imaging apparatus with the one-element developing system described for invention <1> or <2>, characterized by using a developing agent carrier to recover a transferring residual toner.

<6> A capsulated toner consisting of a core and a shell resin enclosing the core, characterized in that the shell does not comprise a charge control agent for controlling the charge level, but the core comprises only said charge control agent.

<7> A capsulated toner consisting of a resin core and a resin shell enclosing the core, characterized in that the content of the resin shell, constituting an outermost layer, is in the range from 0.1 to 4 parts by weight based on the resin constituting the core.

<8> A capsulated toner comprising at least a thermoplastic resin and a coloring agent as components, and using two or more polymerizable monomers having different Tgs, characterized in that the volume intrinsic resistance of the shell layer constituting an outermost layer is larger than that of the material existing inside of the shell layer.

<9> A toner as described for invention <8>, characterized in that the content of the shell layer resin constituting an outermost layer is in the range from 0.1 to 4 parts by weight based on the resin constituting the core.

<10> An electrophotographic imaging apparatus with a one-element developing system, characterized by using a member with high water repellency as a member contacting an image carrier in the apparatus described for invention <1> or invention <2>.

<11> An electrophotographic imaging apparatus with a one-element developing system as described for invention <10>, characterized by using a toner constituting of a shell layer and a core wherein both the shell and the core include a resin having a Tg of 60° C. or below and wherein the member with high water repellency has a contact angle of more than 90° against a charged member, as measured with pure water.

<12> An electrophotographic imaging apparatus with a one-element developing system as described for invention <10>, characterized by having a cleaning means which recovers a transferring residual toner, and involving a toner recycle system which finally recycles said transferring residual toner in a developing step.

<13> An electrophotographic imaging apparatus with a one-element developing system according to invention <11>, characterized by using a toner comprising a resin having a Tg of 60° C. or below for the resin constituting the shell layer and the core, and using a member with high water repellency which has a contact angle of more than 90° against a charged member, as measured with pure water.

<14> An electrophotographic imaging apparatus with a one-element developing system according to invention <11>, characterized by having a cleaning means which recovers a transferring residual toner, and involving a toner recycle system which finally recycles the transferring residual toner in a developing step.

<15> The toner cartridge wherein the toner according to invention <1> is stored.

<16> The developing unit wherein the toner cartridge according to invention <15>, supplied.

<17> The toner cartridge wherein the toner according to invention <4> is stored.

<18> The developing unit wherein the toner cartridge according to invention <10> is supplied.

BRIEF DESCRIPTION OF DRAWINGS

FIG. 8 defines in tabular form, examples of various toner structures with different CCA loading.

FIG. 9 is a tabular summary showing absence or presence of a developing toward a background in continuous printing when using toners having each of the structures defined in FIG. 8.

FIG. 27 presents a tabular summary of a relationship between glass transition temperature and contact angle.

Figure 1:
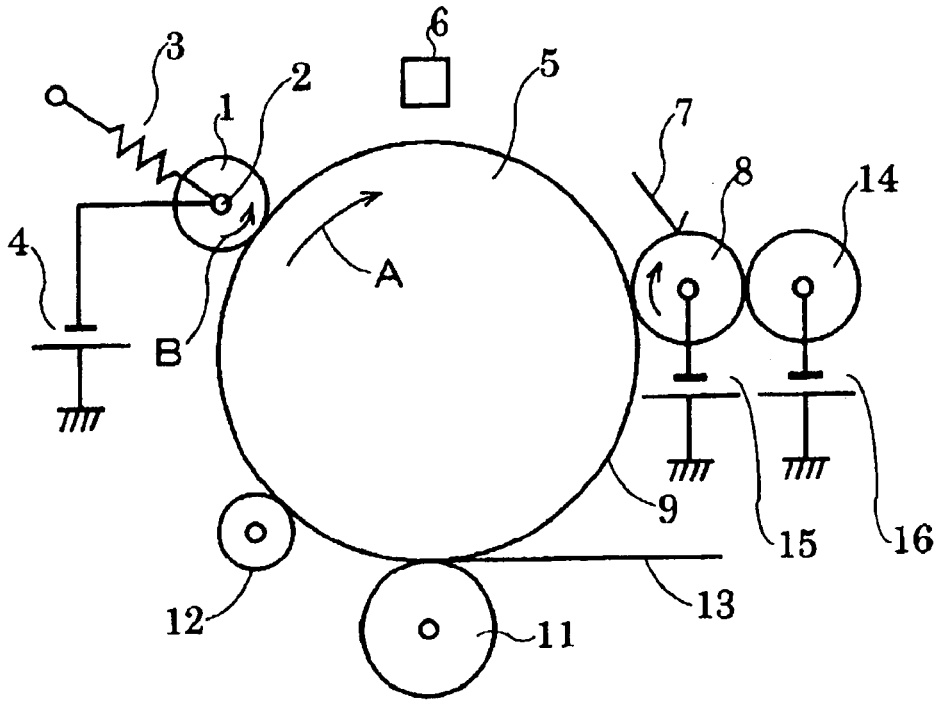
FIG. 1 is a schematic diagram of an imaging apparatus suitable for carrying out this invention.

According to the present invention, there is provided a toner cartridge wherein the toner described above is stored.

According to the present invention, there is provided a developing unit wherein the toner cartridge described above is supplied.

DESCRIPTION OF THE PREFERRED EMBODIMENTS

Embodiment 1

Referring to the schematic diagram of FIG. 1, an imaging apparatus suitable for this invention and the nature of a capsulated toner that is the object of this invention, are described below. The inventors discuss herein the nature of capsulated toners which have been proposed before with diversity and in detail to find that certain described problems existed. The inventors observe the intrinsic electrifying property of the capsulated toner that has enough low-temperature fixability and indicates distinct advantages over conventional toners. More details are indicated as follows.

The most important advantage of the capsulated toner is that it can be fixed with low energy without sacrificing a high-temperature stability. Study by the inventors has disclosed that a certain incompatibility between the resin used for the core and the resin used for the shell is required in order to actually provide this advantage. More precisely, there should be a clear interface between the core and the shell.

While the shell resin of the capsulated toner should be harder than that of the core, it is necessary to use a shell resin whose polarity is higher than that of the core resin (i.e. the electrical resistivity is smaller) in order to satisfy this interface requirement while maintaining their incompatibility. As described herein, the capsulated toner of this invention uses a shell resin whose polarity is higher than that of a core resin. In other words, this capsulated toner is more likely to have smaller electric resistance at its surface than within. If an inner resistance (volume intrinsic electrical resistivity) of a shell resin is not maintained high, charge is dissipated through the surface of the toner from the surface of a traveling photoreceptor drum, leading to attenuation of the charge level.

It is presumed that this is a reason why the volume intrinsic electrical resistivity of the whole capsulated toner should be maintained higher than that of the single-layer toner. By way of comparison, when styrene, which is used in the core resin, is used in the shell resin, the decrease of the surface potential of the photoreceptor drum cannot be seen until it attains a low resistivity, as in the case of the single-layer toner. However, in this example a shell with normal thickness could not provide high-temperature stability because the interface between the core and the shell is not clear.

In order to provide a high-temperature stability in such a construction, there must be approximately two times more shell resin, but fixability at this point has no advantage over a single-layer toner, and no significance of making the toner capsulated can be observed. Thus, good incompatibility between the shell resin and the core resin is mandatory so as to keep a good fixability and a high-temperature stability well-balanced. Therefore, it is necessary to use a resin for the shell whose electrical resistivity is lower than that of the core resin, but whose polarity structure is higher than that of the core resin.

Figure 2:
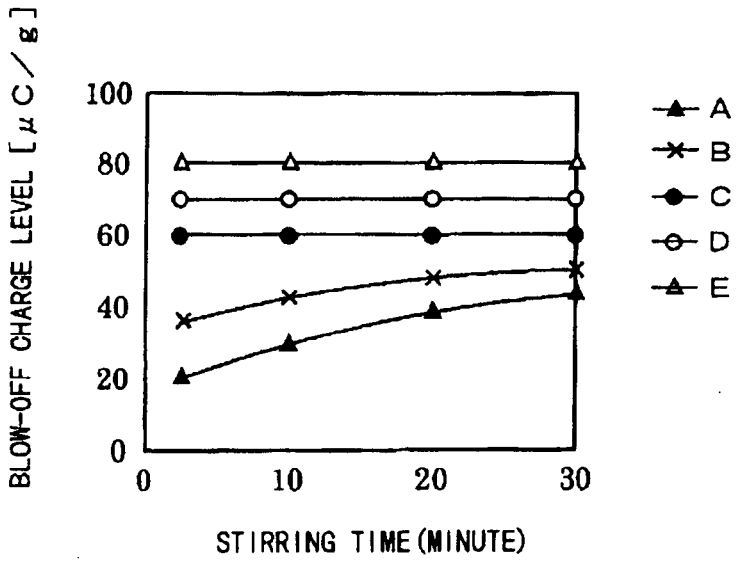
FIG. 2 presents graphical data that illustrates a time-dependency of the blow-off charge level of the polymerizable toner having capsulated structure.
Figure 3:
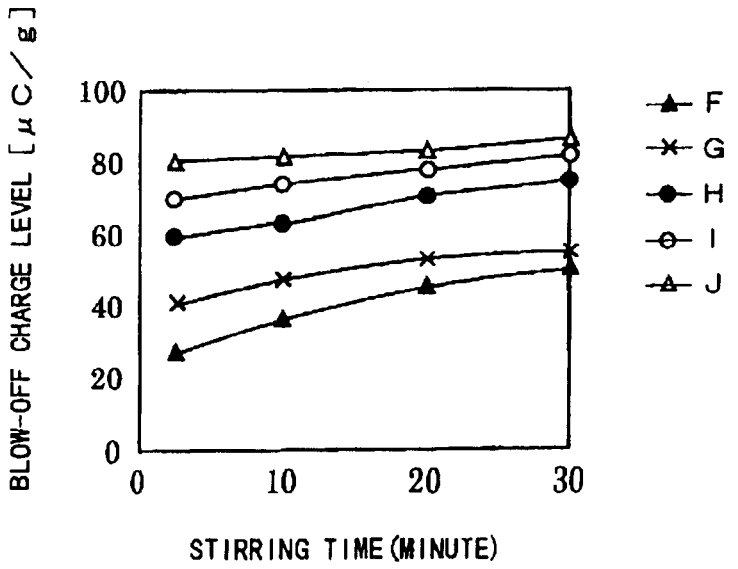
FIG. 3 presents graphical data that illustrates a time-dependency of the blow-off charge level of the polymerizable toner having single layer structure.

The above-mentioned structural features directly indicate the electrifying property of the capsulated toner. FIG. 2 shows the time-dependency of the blow-off charge level of a polymerizable toner that has a capsule structure. FIG. 3 shows the time-dependency of blow-off charge level of a polymerizable toner that has a single layer structure.

The blow-off charge level of toners was measured by means of a particle charge level measuring apparatus MODEL TB-2000 (referred to as blow-off charge level measuring apparatus) manufactured by Toshiba Chemical Inc. under the condition of a $N_2$ gas pressure of 1.0 kg/cm$^2$ and a toner density of 5%. Model TEFV-150/250 provided by Powder Teck Inc. was used as a carrier in measuring.

When the capsulated toner comprises a small amount of the charge control agent (CCA), the blow-off charge level becomes larger with increased stirring time. More specifically, the longer the toner is stirred, the stronger it is electrified. If a given amount or more of CCA is added, the charge level does not depend on the stirring time. On the other hand, in the polymerizable single-layer toner, the tendency that the charge level becomes larger with increasing stirring time is weakened with increased loading of the CCA, but the dependency itself does not disappear.

The difference between the two is considered as follows. As noted above, the capsulated toner endowed with advantages of stability and a low-temperature fixability requires that the resin of its shell have a higher polarity structure that that of the core. This means that charge is easily dissipated from the surface of the electrified toner particles.

It may be considered that the loss of time-dependency of charge on the capsulated toner in a system in which enough CCA is added, indicates that a charge received by the toner and a charge dissipated are apparently well-balanced. To the contrary, in all systems using single-layer toner, the charge level gradually increases. In this regard, it may be considered that the charge once captured is resistant to dissipation due to a large surface resistivity of the single-layer toner.

Figure 4:
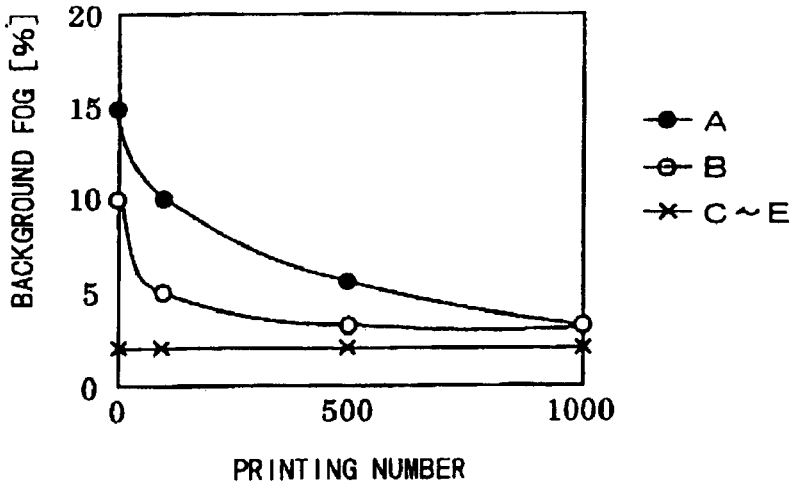
FIG. 4 presents graphical data of background fog (No. 1).
Figure 5:
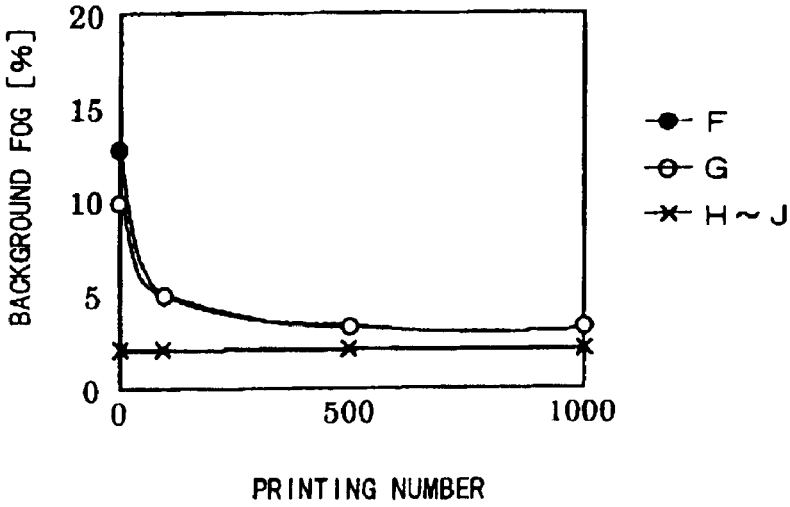
FIG. 5 presents graphical data of background fog (No. 2).

FIGS. 4 and 5 are graphs illustrating a level of background fog that occurred within the imaging apparatus described in FIG. 1 when continuous printing was conducted using the toners whose blow-off charge levels are indicated in FIGS. 2 and 3, respectively. The term "background fog" denotes a phenomenon of staining caused by toner deposition on areas of the printing medium such as plain paper where the white color of the medium (background) should be seen. Normally charged toners are deposited only on the areas intended to be turned black, but some toners, charged with the opposite polarity, are deposited on the areas that should remain white, resulting in a deterioration of printing quality.

Toners A, B, F and G develop more fog at the start of printing than during continuous printing. This is because the blow-off charge level does not rise sharply or quickly. More specifically, there are a considerable number of toner particles that initially are not electrified enough, and so they contribute to the background fog as oppositely charged particles.

Contrary to this, the charge levels of toners C, D and E and H, I and J do not depend on time and indicate more stability than during the initial phase of use of toners A, B, F and G. Therefore, in actual printing with toners C, D and E and H, I and J the background fog is less than that of the initial phase of use of toners C, D and E and H, and remains stable during continuous printing.

Figure 6:
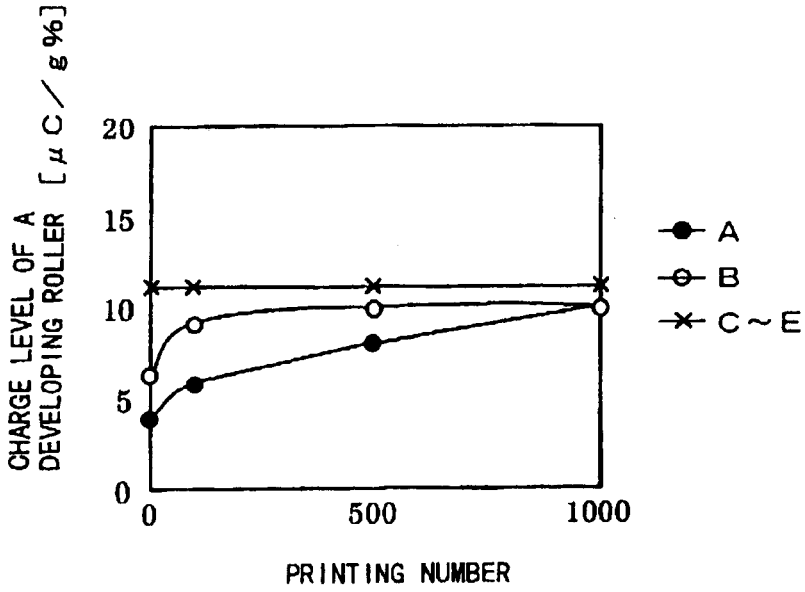
FIG. 6 presents graphical data of a charge level on a developing roller (No. 1).
Figure 7:
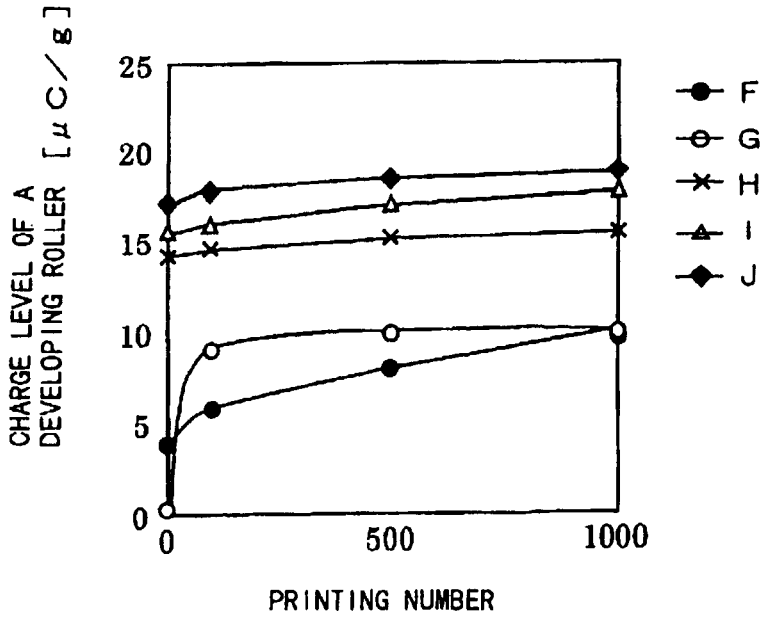
FIG. 7 presents graphical data of a charge level on a developing roller (No. 2).

FIGS. 6 and 7 are graphs of the charge levels on the developing roller using the toners A–J. According to these figures, it has been found that toner having a bad background fog at initial printing shows the blunt rising edge of the charge level (a charge level rise not sharp or quick), on the developing roller, similar to the time-dependency of the blow-off charge level.

Then, a charge level of a toner on a developing roller q(μc/g) is defined as follows:

$$q:=(2Vt\times O\epsilon t)/\delta P(dt)^2$$

Vt: surface potential of a toner layer on a developing roller $\epsilon O$: permitivity in vacuum, $8.855\times10^{-12}$ c/Vm $\epsilon t$: relative permitivity of the toner layer, 1.44

$\delta$: true density of the toner, $1.175\times10^3$ (kg/m$^3$)

P: filling percentage of the toner layer, 40% dt: thickness of the toner layer (m).

The difference between a blow-off charge level, and a charge level on the developing roller, denotes the difference between a charge level of a binary developing system and that of a one-element developing system. In other words, if the same toners are used, the difference of systems that give charge to toners, causes a several-fold difference in toner charge levels.

In spite of a lot of advantages of a one-element system as compared with a binary system, such as simpler structure and easier maintenance, a difficulty of giving charge to the toner is a disadvantage of the one-element system. This can be attributed to the fact that the one-element system relies for its electrical charging of the toner on frictional contact between members that have restricted surface areas such as a developing roller, a toner supplying roller and a photoreceptor drum, as opposed to the binary system, which uses frictional contact between an "electrification member" having very large overall surface area, namely a so-called carrier, with which the toner rubs as it is mixed therewith. Thus, increasing the toner charge level becomes extremely important when the capsulated toner is used in the one-element system.

FIG. 8 lists examples of various toner structures. FIG. 9 summarizes the presence or absence of developing toward background (to form a so-called "background fog") in continuous printing when such toner is used under two different environmental conditions.

Toner J showed developing toward the background, i.e., the background fog phenomenon, in both an environment of 10° C. temperature and 20% relative humidity, and an environment of 25° C. temperature and 55% relative humidity, and toner I showed it only at the lower temperature of 10° C. and lower relative humidity of 20%. This is a phenomenon wherein the toner having excess charge among toner particles on the developing roller adheres to a background area (non-exposure area) essentially not intended to be developed, resulting in an extreme deterioration of printing quality.

For toner J, the background fog phenomenon occurred when 500 prints were printed under 25° C. and 55% relative humidity, and after 100 prints were printed under 10° C. and 20% relative humidity. This phenomena can be caused by gradually increasing the frictional charging with the stirring in the developing device.

For the toner I, the background for phenomenon was considered to be generated because the toner was vigorously frictionally electrified under a low temperature and a low relative humidity, such as 10° C. and 20%.

Depending on the charge level of the toner on the developing roller (the charge level of the toner used) as shown in FIG. 7, the developing toward the background that occurred when the single-layer toner was used, can be described. If the charge level of toner on the developing roller, in an environment of under 25° C. and under 55% relative humidity, exceeded approximately 20 μc/g, development toward the background occurred. On the other hand, as shown in FIG. 6, if the capsulated toner had a blow-off charge level above 60 μc/g (as did toners A, B and C as shown in FIG. 2), the charge level of the toner implemented was constant at about 11 μ/g, regardless of the number of prints, and showed such a constant level even in the continuous printing.

The capsulated toner does not behave to gradually increase the charge level as does the single-layer toner. Therefore, development toward a background does not occur. Considering the nature of the single-layer toner, showed in FIG. 7, the well-known fact that too high a charge level causes excessive electrification resulting in poor printing quality, is confirmed. In other words, toner having either too low or too high a charge level deposits toward the background. Thus, for the single-layer toner, actual toner design is performed by balancing between trade-offs. Regarding the capsulated toner, however, the toner that has a relatively high blow-off charge level as compared with that of the single-layer toner, can provide stable electrifying properties that are hard to obtain with the single-layer toner. This is the characteristic electrifying physical property of the capsulated toner, and so use of capsulated toner is in great ascendancy.

As a result of the above, the inventors have been able to solve the problem that it is difficult to use the single-layer toner unless its blow-off charge level is set within a constant range, by using capsulated toner having a blow-off charge level of 60 μc/g or more, which has facilitated their design with toner electrifying properties, as well as to their providing an imaging apparatus that can make uniformly high quality prints in continuous printing.

Here, the reversal developing using negatively charged toner is illustrated as a convenient example. Again referred FIG. 1, this apparatus is described. FIG. 1 is a cross-sectional view of the imaging apparatus. In this figure, a contact-charged member 1 (referred to as a charged roller hereinafter) rotates about a conductive shaft 2. This conductive shaft 2 is pushed by a spring 3 against an image carrier 5 that is rotatively driven in the direction of arrow A. The contact-charged member 1 therefore is driven into rotation in the direction of arrow B by image carrier 5 (referred to as a photoreceptor drum hereinafter).

In this embodiment, the conductive shaft 2 has applied to it −1350V from the power supply 4. Under these conditions, the surface potential of the photoreceptor drum Vp1, after passing against the charged roller, is −800V.

Next, the electrifying portion of the photoreceptor drum 5 is exposed to light by a latent image-writing-exposure-device 6 (LED head), and a latent image is formed on the outer surface of the photoreceptor drum 5. This image bearing portion of the drum's outer surface then enters a developing area.

In this embodiment, where the latent image is written by the LED head the surface potential Vp2 of the photoreceptor drum is −50V. The developing agent carrier 8 (also referred to as a developing roller) rotates in the direction of arrow C shown in the figure, and contacts the photoreceptor drum 5 at an appropriate pressure. A developing voltage, in this embodiment −300V, is supplied from the power supply 15 to a metal shaft of the developing roller 8.

The toner-supplying roller 14 rotates in the direction of the arrow D, and contacts and rotates with the developing roller 8. Toner is frictionally electrified at the areas of contact between the developing roller 8 and the toner-supplying roller 14. On the other hand, a developing voltage Vs, in this embodiment −450V, is supplied to a metal shaft of the toner-supplying roller 14 from the power supply 16.

Therefore, charged toner is carried to the surface of the developing roller 8 by the potential difference between the voltage applied to the toner-supplying roller 14 (also referred to as a developing blade) and the voltage applied to the developing roller, where it forms a 10–50 μm thick (preferably 15–30 μm thick) developing agent layer, on the developing roller.

Figure 10:
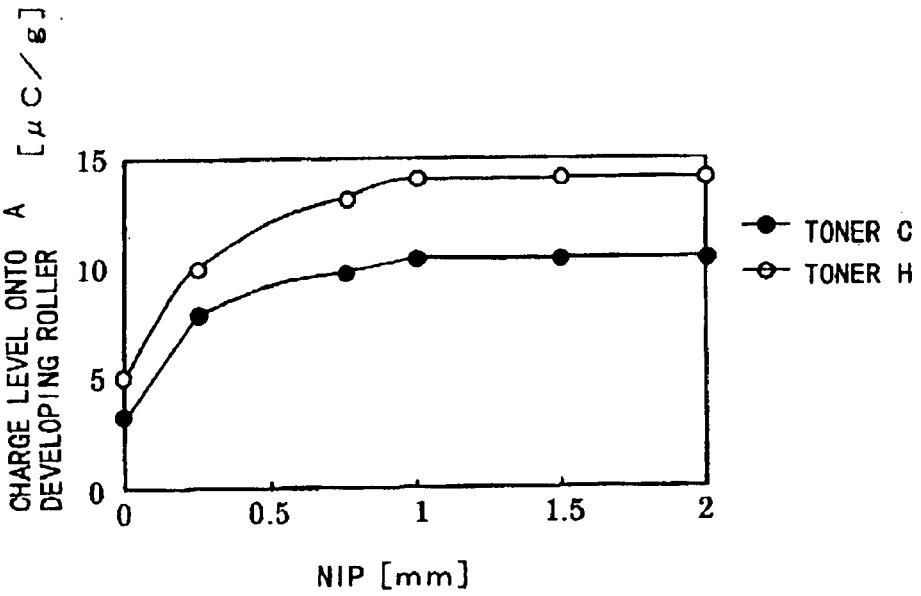
FIG. 10 presents graphical data of a charge level on a developing roller showing a dependency on nip of the charge level on a developing roller.

FIG. 10 shows the dependency of the charge level on the developing roller of toner C and toner H, on the size of the nip of the supplying roller 14 and the developing roller 8 (the difference between a sum of the radii of the rollers and a distance between their shafts).

The charge level is saturated at a nip of 1 mm or more. On the other hand, enlargement of the nip to above this value increases the rotational load of the EP cartridge. Thus, in this embodiment, the nip is set at 1 mm.

Therefore in FIG. 1, a charge level after removing the supplying roller 14 is extremely small, for example 1 μc/g.

Thus, it is confirmed that the actual electrification is performed at the contact area of the supplying roller and the developing roller.

In the imaging apparatus having the above-described configuration, the developing agent (referred to as toner hereinafter) develops the electrostatic latent image. The developed toner image 9 is transferred onto paper by means of a transfer member 11 (referred to as a transferring roller). And in the imaging apparatus above-described a residual toner-recovering member 12 (referred to as a cleaning roller) which temporarily recovers the transferring residual toner remaining on the photoreceptor drum 5 once after the transfer. Thereafter, during a non-developing phase, such as a printing interval or warm-up, a suitable means that is not shown in the figure, returns toner from the cleaning roller to the photoreceptor drum 5 in a reverse direction for recovering, and the developing roller 8 recovers it into the developing device again.

In this embodiment, a negatively charged toner is used, and as the voltage Vd of the developing area is given by the relation $Vp1<Vd<Vp2$, development takes place against the latent image in the developing area. Contrary to this, the transferring residual toner on the photoreceptor drum is recovered at the developing area.

Next, an example of a method of preparing the capsulated toner used in present invention, is described. Suitable resins used for the core and shell materials of the capsulated toner in the present invention include the thermoplastic resins such as vinyl resin, polyamide resin, and polyester resin and the like.

Monomers consisting of vinyl resin in the thermoplastic resins above-mentioned are, for example, styrene or styrene derivatives such as styrene, 2,4-dimethylstyrene, α-methylstyrene, p-ethylstyrene, o-methylstyrene, m-methylstyrene, p-methylstyrene, p-chlorostyrene and vinylnaphthalene; ethylenically monocarboxylic acids and their esters such as 2-ethylhexyl acrylate, methyl methacrylate, acrylic acid, methyl acrylate, ethyl acrylate, n-propyl acrylate, isobutyl acrylate, t-butyl acrylate, amyl acrylate, cyclohexyl acrylate, n-octyl acrylate, isooctyl acrylate, decyl acrylate, lauryl acrylate, stearyl acrylate, methoxyethyl acrylate, 2-hydroxyethyl acrylate, glycidyl acrylate, phenyl acrylate, methyl α-chloroacrylate, methacrylic acid, ethyl methacrylate, n-propyl methacrylate, isopropyl methacrylate, n-butyl methacrylate, isobutyl methacrylate, t-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, diethylaminoethyl methacrylate; ethylenically unsaturated monoolefins such as ethylene, propylene, butylene, isobutylene; vinyl esters such as vinyl chloride, vinyl bromoacetate, vinyl propionate, vinyl formate, vinyl capronate; substituted ethylenically monocarboxylic acid such as acrylonitrile, methacrylonitrile and acrylamide; ethylenically dicarboxylic acid or their substituents such as maleate; vinyl ketones such as vinyl methyl ketone; and vinyl ethers such as vinyl methyl ether, and the like.

These resins alone or mixtures thereof may be used to prepare the resin of the core materials and the shell materials. A monomer composition for forming the resin of the core materials used for this invention may include a crosslinking agent, if necessary. Examples of the agent include the conventional crosslinking agent such as divinyl benzene, divinyl naphthalene, polyethyleneglycol dimethacrylate, 2,2-bis(4-methacryloxy diethoxydiphenyl) propane, 2,2'-bis(4-acryloxy diethoxydiphenyl)propane, diethyleneglycol diacrylate, triethyleneglycol diacrylate, 1,3-butylenglycol dimethacrylate, 1,6-hexyleneglycol dimetahcrylate, neopentylglycol dimethacrylate, dipropyleneglycol dimethacrylate, polypropyleneglycol dimethacrylate, trimethylol propane trimethacrylate, trimetylol propane triacrylate, tetramethylol methane tetraacrylate, and the like. Combinations of two or more these crosslinking agents may be used as required.

Polymerization initiators used in preparing the thermoplastic resins for the core materials include azo- or diazo-polymerization initiator such as 2,2'-azobis(2,4-dimethylvaleronitrile), 2,2'-azobis isobutylonitrile, 1,1'-azobis(cyclohexane-1-carbonitrile), 2,2'-azobis-4-methoxy-2,4-dimethylvalerontrile, and the like; and peroxide polymerization initiator such as benzoyl peroxide, methyl ethyl ketone peroxide, isopropyl peroxycarbonate, cumene hydroperoxide, 2,4-dichlorobenzoyl peroxide, lauroyl peroxide, dicumyl peroxide, and the like.

In the present invention, the core material of the capsulated toner contains a coloring agent, which may be selected from among all of the dyes and pigments used as conventional coloring agents for toner. Examples of coloring agents that may be used for this invention include various carbon blacks prepared by a method selected from among the acetylene black method, the thermal black method, the channel black method and the lamp black method; grafted carbon black whose surface is covered with a resin; Brilliant First Scarlet, Phtalocyanin Blue, nigrosine dyes, Pigment Green B, Rhodamine B Base, Permanent Brown FG, Solvent Red 49 and a mixture thereof.

In this invention, a charge-controlling agent may be incorporated into the core material. Examples of negatively charged charge-controlling agents include, but are not be limited to, AIZENSPIRON BLACK TRH available from Hodogaya Chemical Ltd., metal alloy azo dyes such as BONTRON S-31, BONTRON S-32, BONTRON S-34, BARIFIRST BLACK 3804 (all manufactured by Orient Chemical Ltd.), quaternary ammonium salts such as COPY CHARGE NX VP 434 available from Hoechst Ltd., copper phthalocyanine dyes of nitroimidazole derivative, metal complexes of alkyl salicylate derivatives such as BONTRON E-81, BONTRON-82, BONTRON E-85 available from Orient Chemical Ltd., and the like.

Examples of positively charged charge-controlling agents, which are not intended to place any limitation on the above-mentioned negatively charged charge-controlling agents, include Nigrocine dyes such as OIL BLACK BS, BONTRON N-01, BONTRON N-07, BONTRON N-11, NIGROCINE BASE EX, and OIL BLACK SO, which are available from Orient Chemical Ltd., triphenylmethan dyes containing tertiary amine as a side chain, quaternary ammonium salt compounds such as BONTRON P-51 available from Orient Chemical Ltd., cetyltrimethyl ammonium bromide, COPY CHARGE PX VP 435 available from Hochest Ltd., polyamine resin such as AFP-B available from Orient Chemical Ltd., and imidazole derivatives, and the like.

If necessary, one or more offset preventing agents optionally may be incorporated into the core material to improve the offset resistance. Examples of offset preventing agents include polyolefins, metal salts of fatty acid, higher fatty acids, fatty acid esters, partially saponified fatty acid esters, higher alcohols, paraffin waxes, silicon oils, amide waxes, silicon vanishes, polyhydric alcohols and aliphatic fluorocarbons.

Examples of polyolefins above-mentioned, include polypropylene, polyethylene and polybuten. Examples of metal salt of fatty acid include zinc, magnesium or calcium metal salt of maleic acid; zinc, cadmium, barium, lead, iron, nickel, cobalt, copper, aluminum, or magnesium metal salt of stearic acid; dibasic lead stealate; zinc, magnesium, iron, cobalt, copper, lead or calcium metal acid of oleic acid; aluminum or calcium metal salt of palmitic acid; a salt of capric acid; lead caproate; zinc or cobalt metal salt of linolic acid; calcium ricinoleate; zinc or cadmium metal salt of ricinolic acid, and a mixtures thereof.

Examples of fatty acid esters above-mentioned, include ethyl maleate, butyl maleate, methyl stearate, butyl stearate, cetyl palmitate, ethylene glycol ester of montanic acid, and the like. Examples of partially saponified fatty acid above-mentioned include a montanic acid ester partially saponified with calcium.

Examples of higher fatty acid include dodecanoic acid, lauric acid, myristic acid, palmitic acid, stearic acid, oleic acid, linolic acid, ricinolic acid, arachic acid, behenic acid, lignoceric acid, selacholeic acid, and a mixture thereof. Examples of higher alcohol above-mentioned include dodecyl alcohol, lauryl alcohol, myristyl alcohol, palmityl alcohol, stearyl alcohol, and the like.

Examples of the paraffin wax above-mentioned include natural paraffins, microwax, synthetic paraffin, chlorinated hydrocarbon and the like. Examples of the amide wax above-cited include stearic acid amide, oleic acid amide, palmitic acid amide, lauric acid amide, behenic acid amide, methylenebis stearamide, ethylenebis stearamide, N,N'-m-xylylenebis (stearic acid amide), N,N'-m-xylylenebis-(12-hydroxystearic acid amide), N,N'-isophthalic acid bisstearylamide, N,N'-isophthalic acid bis-(12-hydroxy stearylamide), and the like.

Examples of the polyhydric alcohol ester include glycerin stearate, glycerin ricinoleate, glycerin monobehenate, sorbitan monostearate, propylene glycol monostearate, sorbitan trioleate, and the like. Examples of silicone varnish include methyl silicone varnish, phenyl silicone varnish, and the like. Examples of the aliphatic fluorocarbon include low molecular weight compounds of ethylene tetrafluoride and propylene hexafluoride.

Among said materials listed above, at least the polymerizable monomer, the polymerization initiator and the coloring agent which form the core material are blended, and if necessary, the crosslinking agent, the wax, and the charge-controlling agent are further blended to form mixture. This mixture is dispensed into a dispersion medium and polymerized to form a particle of the core.

Examples of dispersion medium include water, methanol, ethanol, propanol, butanol, ethyleneglycol, glycerin, acetonitrile, acetone, isopropyl ether, tetrahydrofuran, dioxane, and the like. These may be used alone or in combination.

A dispersion stabilizer may be used to stabilize a dispersion of the dispersion medium. All of the known dispersion stabilizers may be used. Examples of the agents include polyvinyl alcohol, polystyrene sulfonate, hydroxymethyl cellulose, hydroxyethyl cellulose, hydroxypropyl cellulose, carboxymethyl cellulose, sodium polyacrylate, sodium dodecylbenzene sulfonate, sodium tetradecyl sulfate, sodium pentadecyl sulfate, sodium octyl sulfate, sodium allyl-alkyl-polyether sulfonate, sodium oleate, sodium laurylate, sodium caprinate, sodium caprylate, sodium caproate, potassium stearate, calcium oleate, sodium 3,3-disulfone diphenyl urea-4,4-diazo-bis-amino-β-nawatol-6-sulfonate, ortho-carboxybenzene-azo-dimethyl aniline, sodium 2,2,5,5-tetramethyl-triphenylmethan-4,4-diazo-bis-β-naphtoldisulfonate, tricalcium phosphate, ferric hydroxide, titanium hydroxide, aluminum hydroxide, and the like. These dispersion stabilizers may be used alone or in combinations of two or more.

The suspension thus obtained is kept at 50 to 100° C. with stirring to continues or complete the polymerization.

During or after completing the polymerization, the second polymerizable monomer is added to the suspension to conduct seed polymerization. More specifically, an aqueous suspension comprising particles of thermoplastic resin containing coloring agent (referred to as "intermediate particles" hereinafter), which is partially or completely polymerized by the first polymerization, is prepared. At least a vinyl polymerization initiator and the vinyl polymerizable monomers are added to the suspension, and after the vinyl polymerizable monomer is absorbed by the intermediate particles, monomers in the intermediate particles are polymerized therein. The vinyl polymerizable monomers that can be absorbed by the intermediate particles may be directly added alone, or may be added in the form of an aqueous emulsion. The aqueous emulsion added is an emulsion in which the vinyl polymerizable monomers and the vinyl polymerization initiator are emulsified and dispersed together with a dispersion stabilizer in water. If necessary, a crosslinking agent, an offset-preventing agent and a charge-controlling agent may be added thereto.

The shell material may be prepared by using the same vinyl polymerization initiator, crosslinking agent and dispersion stabilizer for seed polymerization as those used in the production of intermediate particles. If necessary, polymerization conditions of resins for forming the shell can be optimized by using water-soluble polymerization initiators.

It is desirable that polymerizable monomers used herein are selected to be resins having a Tg above 75° C. after polymerization. In other words, it is desirable that the Tg of the shell resin be 75° C. or above. The inventors are aware of no prior art reporting preparation of a capsulated toner with a shell resin having a Tg that is sufficiently elevated to ensure enough blocking resistance. As is illustrated by the presently disclosed embodiment of a capsulated toner according to the present invention, however, it is very effective since it has enough blocking resistance that the Tg of resins forming the outermost layer is 75° C. or above.

The addition of vinyl polymerizable monomers or aqueous emulsion causes the coating of the surface of the intermediate particles with the vinyl polymerizable monomer, and swelling of the core particle to some extent. Then the polymerizable monomers are polymerized to form a shell resin, i.e. seed polymerization that uses the intermediate particles as core particles is performed to complete the capsulated toner.

As the above-described process of manufacture provides a core that fixes well at a low energy and a shell resin that has good blocking resistance even under high temperature and high pressure conditions, a capsulated toner, in which fixation at a low temperature and an offset resistance are highly balanced, can be obtained.

Although there is not any particular limitation regarding a particle diameter of the capsulated toner in this invention, it is preferable that the average particle diameter should usually be in the range from 3 to 30 μm.

The capsulated toner in this invention may include a flow improver and a cleaning improver, if necessary. Examples of a flower improver are silica, alumina, titanium oxide, barium titanate, magnesium titanate, calcium titanate, strontium titanate, zinc oxide, quartz sand, clay, mica, wollastonite, diatomaceous earth, chromium oxide, cerium oxide, iron oxide red, antimony trioxide, magnesium oxide, zirconium oxide, barium sulfate, barium carbonate, calcium carbonate, silicon carbide, silicon nitride, and the like.

A fine powder of silica means a fine powder of a compound having a Si—O—Si bond and may be produced by either dry or wet processes. The fine powder of silica such as aluminum silicate, sodium silicate, potassium silicate, magnesium silicate, zinc silicate, as well as anhydrous silicon dioxide, may be used. In addition, the fine powder of silica having a surface treated with a silane coupling agent, a titanium coupling agent, a silicone oil, a silicone oil having amine on its side chain, may be used.

Examples of the cleaning improver include fine powders of a metal salt of a higher fatty acid represented by zinc stearate, and fluoropolymer, and the like. Furthermore, the additives for regulating developability, such as fine powders of a polymer of methyl methacrylate, butyl methacrylate or others, may be also used.

When the heat pressure-fixable capsulated toner, whose blow-off charge level is selected according to the present invention, contains a fine powder of a magnetic substance, it can be used alone as a developing agent. When the toner does not contain the fine powder of the magnetic substance, it may be used as a nonmagnetic-one-element-developing agent.

Embodiment 2

Next, Embodiment 2 of the present invention is described. It is conventional to electrify (transfer charge) an imaging carrier (referred to as a photoreceptor drum) by using a non-contact developing device (transferring device) called as a corotron or scrotoron system. This system requires a high voltage power supply, and principally could not avoid the generation of ozone, so that an additional device such as an ozone-removing filter is required.

An ozone-free system which solves these problems is a system which electrifies (transfers charge to) the photoreceptor drum by using a contact-charging (transferring) device, and which allows the generation of ozone to be substantially eliminated, because it is capable of use at a lower voltage than the power supply. The ozone-free charging (transferring) device comprises a roller device that uses for charging a layer of solid rubber on a cylinder, rotating in contact with the photoreceptor drum, or a brush-device that uses for charging a cylindrical brush rotating in contact with the photoreceptor drum, etc.

If the capsulated toner that can be fixed at a low energy could be applied to this ozone-free process having some advantages mentioned above, an ozone-free electrophotographic process with low power consumption could be completed, providing an imaging apparatus without adversely affecting the environment. The inventors have been wrestled with the development of such an ozone-free process using the capsulated toner in order to accomplish the above-cited objects.

However, the ozone-free system has a technical problem due to the contact system. More specifically, when the operating time of the EP cartridge becomes longer, it becomes hard to avoid deposition of the toner onto the charging (transferring) device, and while a such condition prevails, the electrification, especially on the photoreceptor drum, is prone to cause problems. This is a phenomenon where abnormal printing, for example background development on a printing surface, occurs because the deposition (adhesion) of toner on the surface of the charged roller (brush) causes a reduction in the surface potential of the photoreceptor drum.

However, it is not a serious problem in actual operation, as this phenomenon is not caused by deposition (adhesion) of only a small amount of toner. According to the study of the inventors, the reduction of the surface potential can be seen when the toner deposition/volume is over 50 μm (1 $mg/cm^2$). Under such a condition, voltage from the power supply is divided by the laminated toner existing on the surface of the charged device, so that the actual voltage toward the charged device is decreased. Although in such cases reduction of the surface potential is a foregone conclusion, such a situation is not usual.

When the capsulated toner is used, however, only a very small amount of the toner existing on the surface of the charged device causes a reduction of the surface potential of the photoreceptor drum. Based on detailed observations, it was determined that for capsulated toner such reduction in surface potential strongly depends on the toner's intrinsic volume resistivity.

Figure 11:
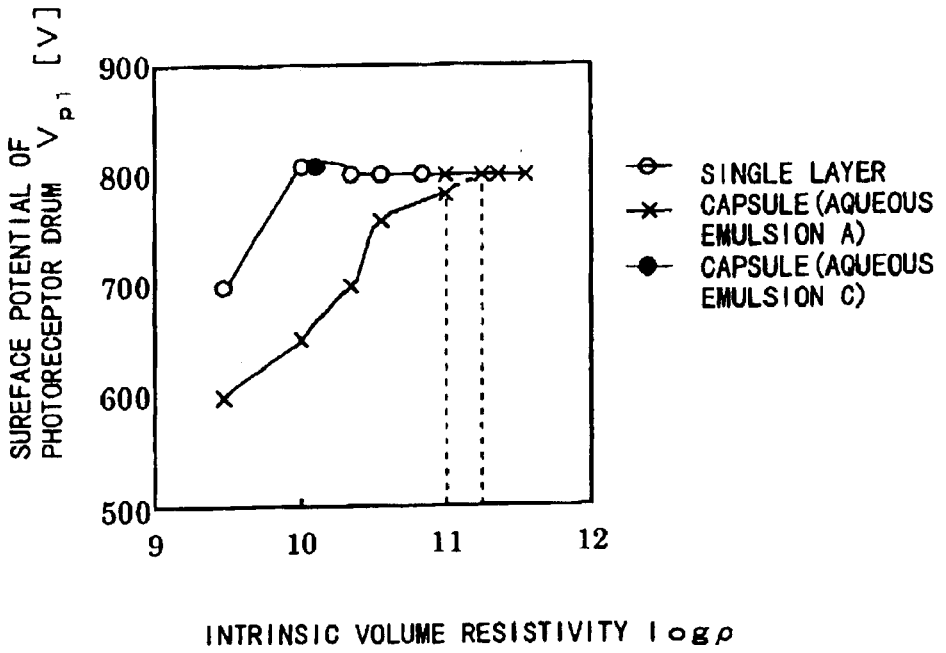
FIG. 11 presents graphical data showing a dependency of surface potential on a intrinsic volume resistivity.

FIG. 11 illustrates the dependency of the surface potential of the photoreceptor drum on the intrinsic volume resistivity of the capsulated toner. As shown in the figure, even though the volume of capsulated toner deposited on the surface of the charged device (a rubber roller is taken as an example in this invention, and referred to as a charged roller hereinafter) is only 0.05 $mg/cm^2$ (toner particles exist separately on the surface of the charged roller), the surface potential of the photoreceptor drum is rapidly decreased when the intrinsic volume resistivity log ρ is below 10. As is evident from this figure, log ρ is preferably 11.2 or above. On the other hand, in the case of single-layer toner under the same conditions, if log ρ is above 10, then this phenomenon does not occurred.

Such a difference in behavior can be described as follows. The greatest advantage of using capsulated toner is that it can be fixed by a low energy without sacrificing high-temperature stability. From their study, the inventors learned that certain incompatibility between the resin used for the core and the resin used for the shell (differences resulting in difficulty to mix with each other) is virtually required in order to satisfy this requirement.

That means in particular that there should be a clear interface between the core and the shell. While the shell resin of the capsulated toner should be harder than the core, it is necessary to use a shell resin whose polarity is higher than that of a core (i.e. its electrical resistivity is smaller) in order to satisfy this requirement while maintaining their incompatibility.

As described regarding this embodiment, the capsulated toner of this invention uses a shell resin whose polarity is higher than that of the core resin. In other words, the capsulated toner is more likely to have a small electrical resistance at its surface as compared with its inner resistance.

If the inner resistance (volume intrinsic electrical resistivity) of a shell resin is not kept large, charge is dissipated from the surface of a photoreceptor drum traveling through the surface of the toner (similarly from the surface of the toner). It is presumed that this is a reason why the volume intrinsic electrical resistivity of the whole capsulated toner should be maintained higher than that of the single-layer toner.

By way of comparison, when styrene, which is used in the core resin, also is used in the shell resin, a decrease of the surface potential of the photoreceptor drum could not be seen unless the resistivity is low, as in the case of the single-layer toner. However, in this example a shell with normal thickness could not provide high-temperature stability because the interface between the core and the shell was not clear.

In order to provide high-temperature stability, approximately two times more shell resin is required, but fixability at this point has no advantage over a single-layer toner, and no significance of making the capsulated toner can be found. Thus, good incompatibility between the shell resin and the core resin is mandatory so as to maintain good fixability and high-temperature stability well-balanced, which requires the use for the shell of resins whose electrical resistivity is lower than that of the core resin, but whose polarity structure is higher than that of the core resin.

Therefore, it is said that capsulated toner should have the intrinsic volume resistivity above-mentioned in order to use the capsulated toner in the ozone-free process (especially when there is a system simultaneously performing toner recycling). Based on the experimentally derived facts above-mentioned, it is more important to keep the intrinsic volume resistivity of the capsulated toner high in the process accompanying the toner recycling that finally recovers the transferring residual toner to the developing roller.

This system could not avoid contact of the transferring residual toner with the surface of the charged roller even though it is temporary before recovering in the developing roller. Therefore, the transferring residual toner always contacts the surface of the charged roller during a long run time. More specifically, satisfactory printing quality could not be obtained due to insufficient charging of the photoreceptor drum when the intrinsic volume resistivity of the capsulated toner does not satisfy the above-mentioned conditions.

The above-mentioned intrinsic volume resistivity is measured as follows:

The intrinsic volume resistivity was measured by a dielectric loss meter type TR-10C manufactured by Ando Electrical Co., Ltd., operating at an oscillator frequency of 1 KHz after preparing the objects to be measured as samples from a 3 g weight tablet forming machine, and calculated as a logarithm using the equation below:

$$\log \rho = \log[(Ajt)\times(1/Gx)]$$

log ρ: intrinsic volume resistivity (logarithm)

Gx: (Conductance ratio)×R

R: conductance measurement value

A: area of electrode (11.34 $cm^2$)

t: thickness of materials (2 mm)

On the basis of the above-conclusion the invention had completed the electrophotographic process ozone-free with low electric-power consumption and good printing quality, by using the capsulated toner having both fixability and high-temperature stability under conditions of an intrinsic volume resistivity of 11.0 or more, in an ozone-free process, especially in an ozone-free process with a toner recycling system.

Figure 12:
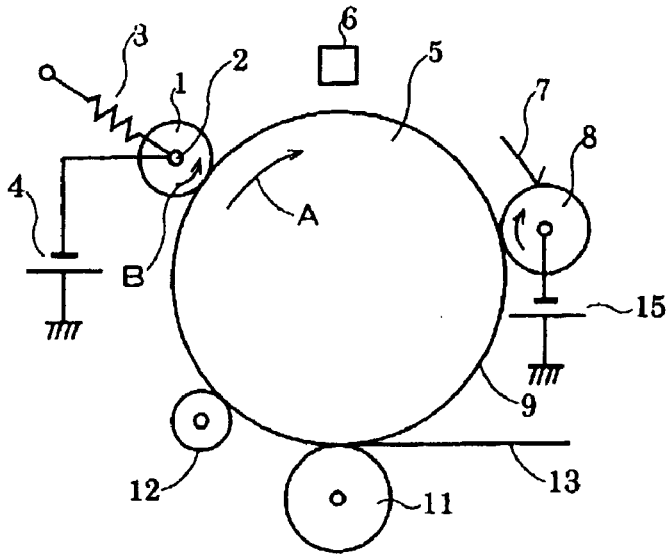
FIG. 12 is a schematic diagram of an imaging apparatus using Embodiment 2.

Reversal developing using negatively charged toner is illustrated FIG. 12 by way of example. FIG. 12 is a schematic block diagram of the imaging apparatus according to Embodiment 2 of the invention. In this figure, a contact-charged member 1 (referred to as a charged roller hereinafter) rotates about a conductive shaft 2. This conductive shaft 2 is pushed by a spring 3 toward an image carrier 5 (referred to as a photoreceptor drum hereinafter) that is rotating in the direction of arrow A, so that the charged roller 1 contacts the outer surface of the rotating photoreceptor drum 5 so as to be coupled therewith and driven in rotation thereby. Also the charged roller 1 has a constant DC voltage applied to it by a special DC power supply 4, whereby the photoreceptor drum 5 is electrified at a constant level.

In this embodiment, a voltage of −1350V is applied to the conductivity shaft 2 from the power supply 4. Under these conditions, the surface potential Vp1 of the photoreceptor drum, after passing through the charged roller 1, is −800V.

Next, the electrified portion of the photoreceptor drum 5 is exposed to light from a latent image-writing-exposure-device 6 (LED head), and a latent image is formed on the outer surface of the photoreceptor drum 5. Then this part enters a developing area. In this embodiment, the surface potential of the photoreceptor drum where the latent image is written by the LED head, is Vp2=−50V. The developing agent carrier 8 (also referred to as a developing roller) rotates in the direction of an arrow C shown in the figure, and contacts the photoreceptor drum at an appropriate pressure. A developing roller 8 is supplied a voltage from the power supply 15. In this embodiment, a developing voltage of −300V is applied by a power supply 15 to a metal shaft of the developing roller 8.

The developing agent layer-forming-member 14 (also referred to as a developing blade), which forms the developing agent (toner) layer on the developing roller, contacts the developing roller at a suitable pressure, and forms a toner layer thickness of 10–50 μm, preferably approximately 15–30 μm.

In the imaging apparatus having the above-mentioned configuration, the developing agent or toner develops an electrostatic latent image 9. The developed image 9 is transferred onto paper by means of a transfer member 11 (also referred to as a transferring roller). And in the imaging apparatus above-mentioned, a residual toner-recovering member 12 (also referred to as a cleaning roller), which recovers a transferring, residual toner, recovers the toner remaining on the photoreceptor drum 5 after the transferring. Thereafter, during a non-developing phase, such as a printing interval or warm-up, a suitable means not shown in the figure returns toner from the cleaning roller to the photoreceptor drum 5 in a reverse direction for recovery, and the developing roller 8 recovers the toner into the developing device again.

In this embodiment, a negatively charged toner is used, and as they have a relation of Vp1<Vd<Vp2, where Vd is the voltage of the developing area, development takes place against the lateral image in the developing area. On the other hand, during the non-developing recovery phase the transferring, residual toner on the photoreceptor drum is recovered at the developing area.

Figure 13:
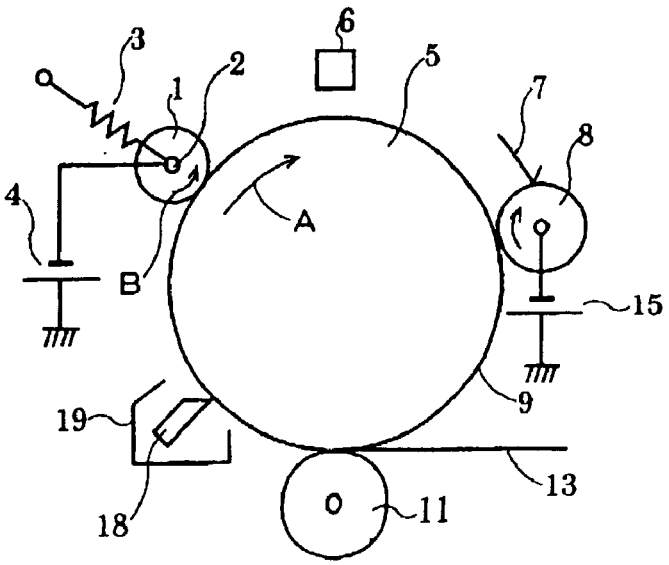
FIG. 13 is a schematic diagram of an imaging apparatus comprising a recovering member of a transferring residual toner of blade system instead of a cleaning roller.
Figure 14:
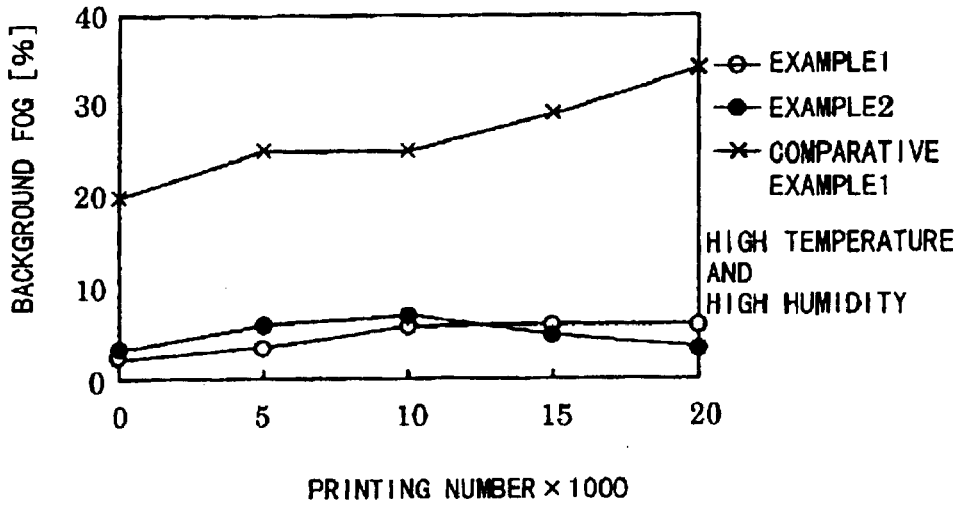
FIG. 14 presents graphical data of background fog according to a number of prints measured in a high temperature, high humidity environment, in Example 1 of Embodiment 3.
Figure 15:
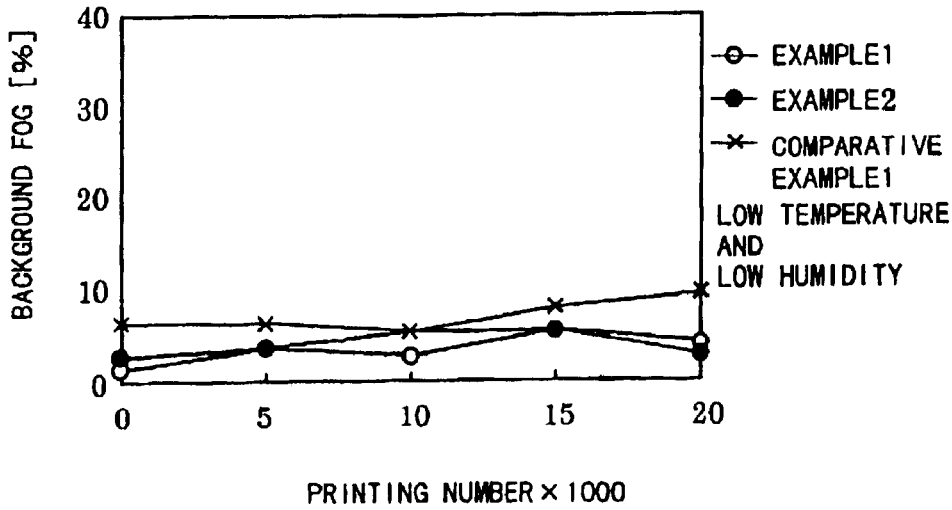
FIG. 15 presents graphical data of background fog according to a number of prints measured in a low temperature, low humidity environment, in Example 1 of Embodiment 3.
Figure 16:
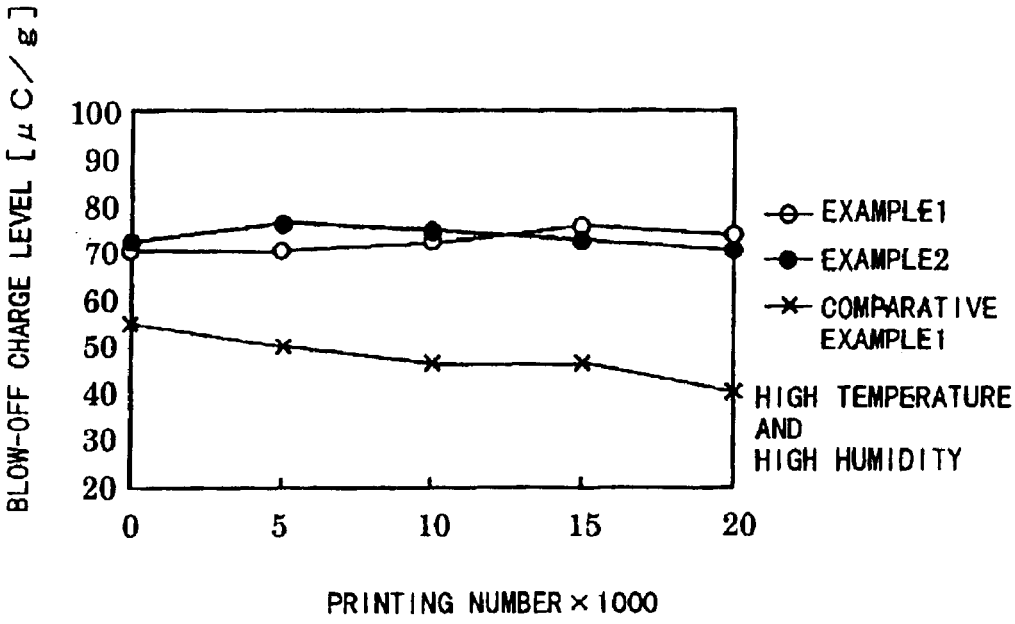
FIG. 16 presents graphical data of blow-off charge level according to a number of prints measured in a high temperature, high humidity environment, in Example 1 of Embodiment 3.
Figure 17:
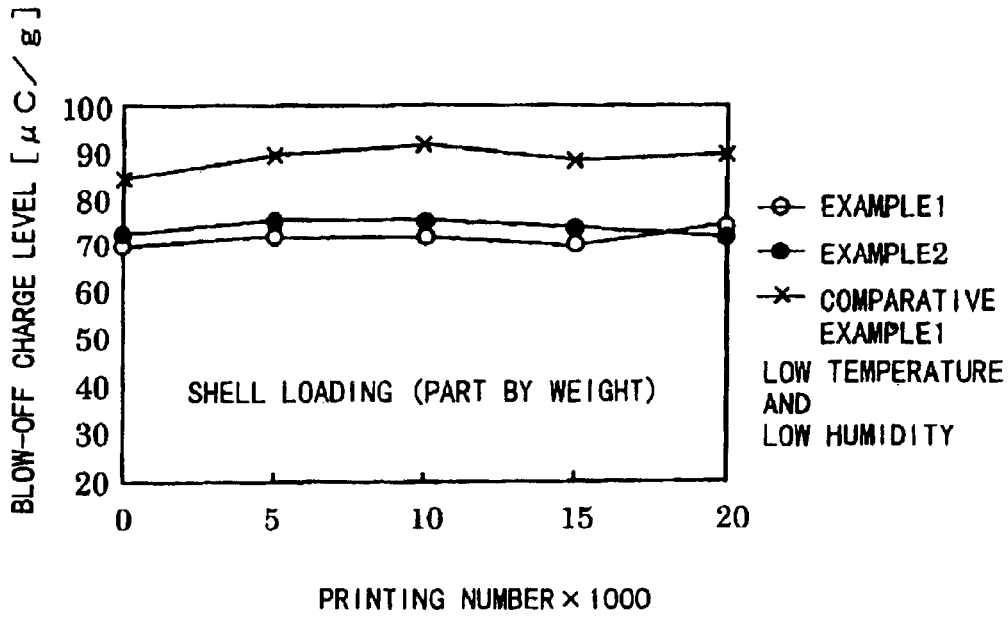
FIG. 17 presents graphical data of blow-off charge level according to a number of prints measured in a low temperature, low humidity environment, in Example 1 of Embodiment 3.
Figure 18:
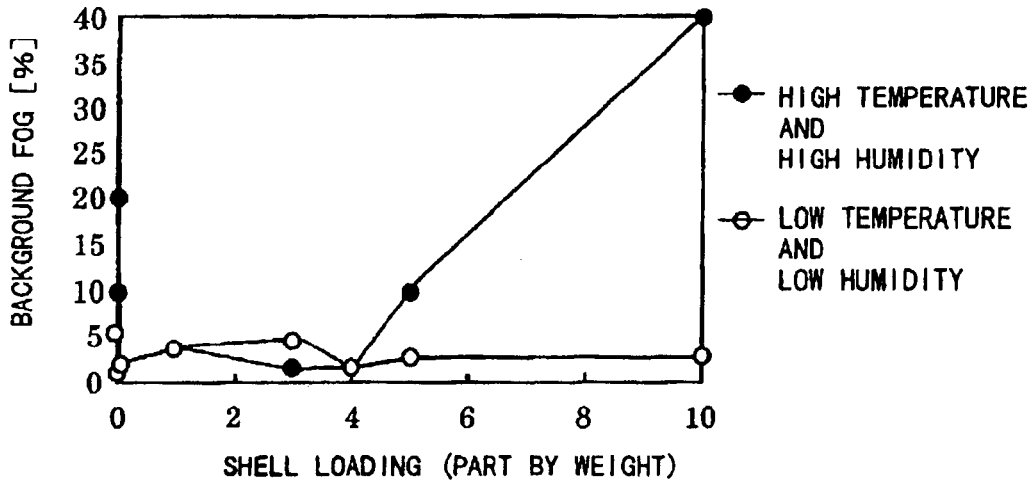
FIG. 18 presents graphical data showing a relationship between a background fog on an initial photoreceptor drum and a shell loading.
Figure 19:
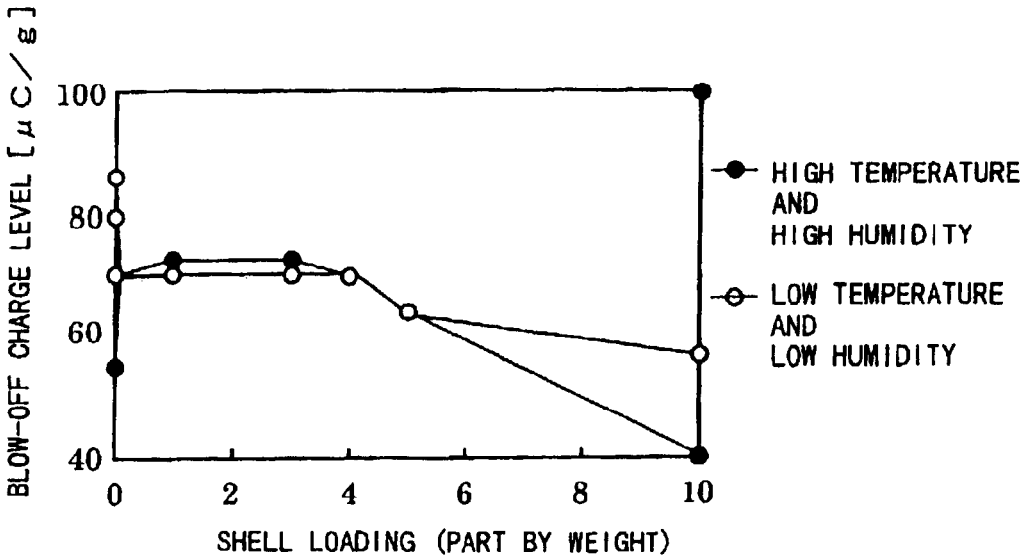
FIG. 19 presents graphical data showing a relationship between a blow-off charge level and a shell loading.
Figure 20:
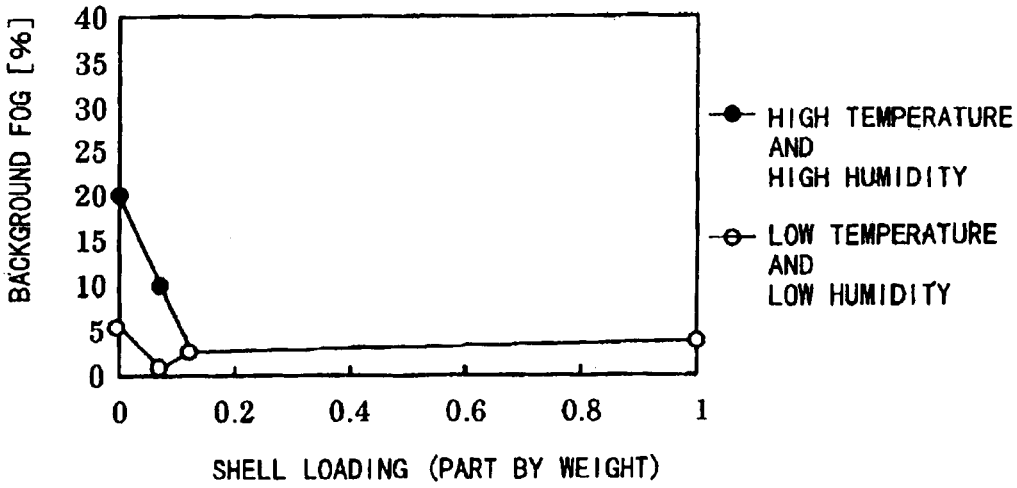
FIG. 20 presents graphical data showing a relationship between a background fog on an initial photoreceptor drum and a shell loading.
Figure 21:
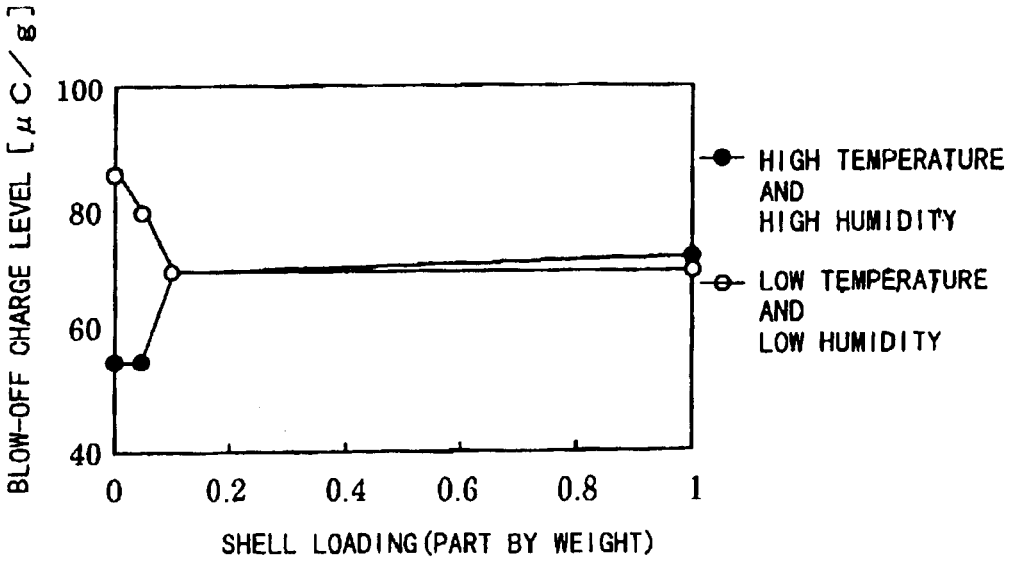
FIG. 21 presents graphical data showing a blow-off charge level as a function of shell loading.

FIG. 13 shows an imaging apparatus having a cleaning blade 18 instead of the cleaning roller 12 of the apparatus shown in FIG. 12. In this example, the transferring residual toner is mechanically recovered by the cleaning blade 18 to be stored in the recovery box 19. FIG. 11 shows the voltage Vp1 when the printing is performed in the imaging apparatus shown in FIG. 1, using toners having different intrinsic volume resistivities.

The detailed method of preparing the toner of the invention is described below, and the volume intrinsic electrical resistivity is adjusted by varying the loading of the carbon black as a coloring agent. The surface potential of the photoreceptor drum Vp1 is the value after five prints at a PRINTING DUTY of 10%. The volume of toner deposited on the charged roller at this time was 0.05 $mg/cm^2$.

This invention solves the problems of the conventional contact-developing system by using the capsulated toner described below, and fully exploits its advantageous simple structure. The heat-pressure fixable capsulated toner with the selected intrinsic volume resistivity of the invention, is used alone as a developing agent when it contains a fine powder of a magnetic substance. When the toner does not contain a fine powder of a magnetic substance, it may be used as a nonmagnetic one-element developing agent or as a binary developing agent mixed with a carrier. The carrier includes, but is not limited to, iron powder, ferrite, glass-beads, or resin-coated thereof, as well as resin carriers such as resins incorporating magnetite powder or ferrite powder, and the mixing ratio of the toner to the carrier is in the range from 0.5 to 20 parts by weight. The particle diameter of the carrier used may be anywhere from 15 to 500 μm.

Embodiment 3

Next, Embodiment 3 is described. Toner is generally based on a resin. The toner also includes coloring agents such as carbon black, a charge control agent (also referred to as CCA hereinafter), which controls the electrifying property, and wax, which prevents an off-set, and so on as additives and materials designed to satisfy various properties required in the toner.

The electrifying property, which directly affects printing quality, is the most important property required of the toner. If the charge level is low, it is more likely to cause a background fog, which has a tendency to deteriorate the reproducibility of dots and lines. If the charge level is too high, it makes the design of the electrophotographic process difficult as it becomes developing efficient worse or requires excess energy in transferring. Therefore, it is necessary to control the toner charge level within the narrow range desired, but the charge level should be stable in different environments and after a long period of continuous printing.

However, it is not easy to satisfy these requirements. As materials such as CCA or carbon black are dispersoid, they, both in theory, and in actual toners, are dispersed in the base resin material with a homogenous distribution. If this distribution in fact has an extremely narrow range, it does not cause a problem, but such a distribution is actually difficult to obtain.

Generally, during printer operations, particles having a certain charge are consumed, but if the toner has a broad charge level distribution, toner having such a broad charge distribution remains in the developing device, increasing the fog as printing continues, which causes a reduction in the reproducability of the dots and lines, so that the printing quality deteriorates. As CCA and carbon are polar materials, they are prone to adsorb or dissociate water molecules, and are more likely to cause a change by virtue of the particular environment.

As a result of this, the electrical resistivity of the toner particles is easily changed, so that it affects the delivery of charge, and is prone to cause an environmental change. As these polar materials are hard to mix with resins due to their properties, they are localized on the toner surface of unbalanced in their distribution on certain particles. These features could not be avoided whenever CCA or carbon was used.

In this embodiment however, the toner's electrifying property is maintained without change not only during an initial phase, but also after an environmental change or a period of continuous printing, and has a sharp (narrow) charge distribution (small variation), so that images may be printed constantly without deterioration of the printing quality.

The inventors found after extensive study that it is extremely effective in a heat-pressure fixable toner comprising at least thermoplastic resin and coloring agent as components, to use a capsulated toner characterized by an outermost shell layer having a larger intrinsic volume resistivity than that of a shell layer that is placed inside of the outermost shell layer, or that of the core's component which has the lowest intrinsic volume resistivity. More specifically, it was found that when the outside of each core particle, which comprises polar materials of a charge control agent and carbon as the dispersoid, is covered with the shell consisting of only a resin, a direct contact of these polar materials with the charge additive member, such as a developing roller, could be avoided, so that the variability of the particles is decreased, and an environmental effect also is decreased, which allows for a superior toner.

In this case, it is assumed that because CCA particles (that are considered to deliver charges) do not exist on the surface of the shell, a frictional electrification of the toner is caused by a charge delivery between the surface of a charge additive member such as a developing roller, and the CCA particles within the core, through the shell layer. Therefore, if the shell is too thick, a barrier to the charge delivery becomes large, resulting in a toner whose charge level is low or rises poorly. The invention discussed, and experimental with the thickness of the shell, and concluded that the ratio of thickness of the shell to that of the core is preferably in a range from 0.4 to 4 parts by weight.

Toner of this invention consists of a core material comprising at least a thermoplastic resin and a coloring agent, and a shell material covering the surface of the core material.

Now, the motif of Embodiment 3 is summarized again:

1. A capsulated toner consisting of at least a thermoplastic resin and a coloring agent, and using two or more polymerizable monomers which turn to the thermoplastic resin after polymerization.
2. The shell layer constituting the outermost layer does not contain polar materials such as CCA or carbon, and is synthesized using only a series of the materials of polymerizable monomers, and a polymerization initiator and cross-linking agent that convert the monomers to resin. Therefore, the outermost shell layer is larger than the component having the lowest volume intrinsic resistivity, which constitutes the inner shell layer or the core.
3. The content of the resin constituting the outermost layer is between 0.1 and 4 parts by weight of the resin constituting the core. A diameter for the core suitable is between 1 and 30 μm.

The heat pressure-fixable capsulated toner of this invention is used alone as a developing agent when it contains a fine powder of a magnetic substance. It may be used as a non-magnetic one-element developing agent or as a binary developing agent mixed with a carrier if the toner does not contains a fine powder of a magnetic substance. The carrier includes, but is not limited to, iron powder, ferrite, glass-beads, or resin-coated thereof, as well as resin carriers such as resins incorporating the magnetite powder or the ferrite powder, and the mixing ratio of the toner to carrier is between 0.5 and 20 parts by weight. The particle diameter of the carrier may be in the range of 15 to 500 μm.

Embodiment 4

Next, Embodiment 4 is described as follows.

Recently, the so-called ozone-free electrophotographic system has been proposed and has gone into actual use in view of the environmental issues concerning ozone. This is a system in which electrification of the imaging carrier (or photoreceptor drum) is conducted through contact with the charged member, and a transferring step could also be performed in an ozone-free system by means of a similar system.

According to this, the electrophotographic process is accompanied by substantially no ozone generation as compared with the conventional electrifying and transferring systems with a corona system. However, this system has a problem. Toner existing on the photoreceptor drum is prone to deposit thereon owing to insufficient cleaning, since the charged member is used in contact with the photoreceptor drum. Once deposited, the toner is subjected to stress when the photoreceptor drum is contacting the surface of the charged member, so that melting and adhesion may easily occur. Once this phenomenon occurs, the photoreceptor drum cannot reach a normal electrifying potential, resulting in poor printing.

This phenomenon especially occurs in an imaging apparatus that uses a so-called low-temperature fixable toner. The term "low-temperature fixable toner" denotes a toner which has as its object to restrict energy consumption to a minimum during the fixation process, and to obtain high fixability. This toner has the capsular structure consisting of a core, and a shell that encloses the outer surface of the core. The capsulated toner is characterized by placing the easy-melting resin in the core (nucleus) and the hard-melting resin in the shell (busk).

Hence, principally, it becomes possible to provide low-temperature fixability in compatible relation with stability. According to the study of the inventors, however, while they have good properties above-mentioned, such toners have technical problems. That is, generally an easily fixable toner is weak in response to mechanical stress, and is prone to deform during a long period of operation. Therefore, adhesion to the charged member is more likely to occur. This is assumed to be based on the following.

Although the capsulated toner provides stability under conditions where the toner is not subjected a large stress, such as during a period of transportation or storage by itself in a toner cartridge, it is prone to deform under conditions where relatively high pressure is applied such as during actual operation. During the actual operation, constant pressure is applied to the toner between the photoreceptor drum and the charged member, but it may be assumed that the temperature of some of the individual particles become elevated by pressure received at this time. As the capsulated toner was originally designed so that the material softens at a low temperature, its deformation is facilitated under a high temperature and a high pressure, resulting in adhesion to the surface of the charged member.

However, now there is an electrophotographic apparatus which combines a contact charged system and a so-called toner recycle system. This is a revolutionary system because it is ozone-free and does not discharge a waste toner. However, this system requires high technology and reliability. In this system, the toner has an increased opportunity to deposit onto the charged member as it passes through an electrifying process, i.e. the contact point of the charged member and the photoreceptor drum, during the transfer of residual toner that is returned from the cleaning member to the photoreceptor drum and is recycled into the developing device. Therefore, this system should pay more attention to toner deposition onto the charged member compared with the system without a toner-recycling system.

In this embodiment, the electrophotographic imaging apparatus, which uses the low-temperature fixable toner, more specifically the toner comprising a resin wherein the lowest Tg is below 60° C., among Tgs of the composite resins of the toner. The apparatus is a contact charged system where operation of an electrifying means of an image carrier is performed by contact of the charged member with said image carrier. The imaging apparatus prevents adhesion of the toner to the charged member, affords stability to the surface potential of the image carrier even during a long period of operation, and performs printing with good printing quality. Then this is effective not only for the charged member but also for all members that are in contact with an image carrier such as a transferring roller or a cleaning roller.

The inventors reached the conclusion, after extensive study, that in the electrophotographic imaging apparatus which uses the toner comprising composite resins which has its lowest Tg below 60° C., among Tgs of composite resin of the toner, the above-mentioned problems are solved by designing the contact angle of the charged member to be more than 90°, measured with pure water. The use of a charged member having a surface property of a large contact angle is regarded as preventing the deposition or adhesion of the toner or a paper powder onto the surface of the charged member. The inventors found that the use of the contact charged member having such a surface property is necessary for the electrophotographic process which uses a low-temperature fixable toner, and that it is more important for the electrophotographic process of a contact charged system to use the low-temperature fixable toner and accompanying toner recycle system, to complete the invention.

This embodiment uses the imaging apparatus illustrated in FIG. 12, that is used for the description of Embodiment 2. In the apparatus in FIG. 12, the surface of the charged roller 1 provides an opportunity for the deposition of the toner returned to the photoreceptor drum 5 by the cleaning roller 12 during the repeated printing operations.

The alternative apparatus illustrated in FIG. 13, as described earlier, comprises as the recycling member for transferring residual toner a blade system, instead of the cleaning roller. In the imaging apparatus in FIG. 13, the transferred residual toner recovered by the cleaning blade 18 is stored in the recovering toner box 19, but is not recovered by the developing roller through the photoreceptor drum as in the case of the apparatus in FIG. 12. Therefore, there is not the deposition of the toner onto the charged roller structure. However, running (continuous printing) reduces the practical capacity of the cleaning blade (due to abrasion of the portion that pressure-contacts the photoreceptor drum, and the like), which could not eliminate the risk of generation of insufficient cleaning.

Figure 22:
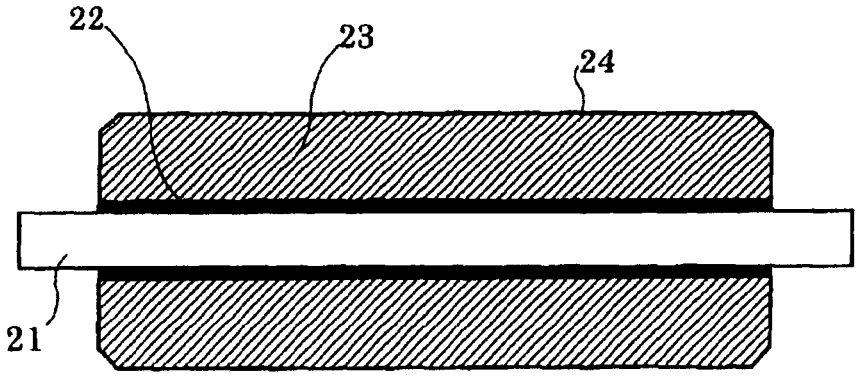
FIG. 22 is a schematic diagram of a charged roller described for Embodiment 4.

FIG. 22 is a schematic diagram showing the charged roller of embodiments of this invention. The charged roller illustrated in the figure has the following configuration.

(A) An electro-conductive adhesive 22 is applied around a conductive shaft 21.

(B) An elastic layer 23, consisting of epichlorohydrin rubber that is adjusted to be semi-conductive by the ion conduction, is provided around the conductive adhesive 22.

(C) The surface of the elastic layer 23 is impregnated in an isocyanate solution adjusted to a constant concentration by solvents, providing a heat-setting-treatment (isocyanate treatment) part 24 at a constant temperature.

Figure 23:
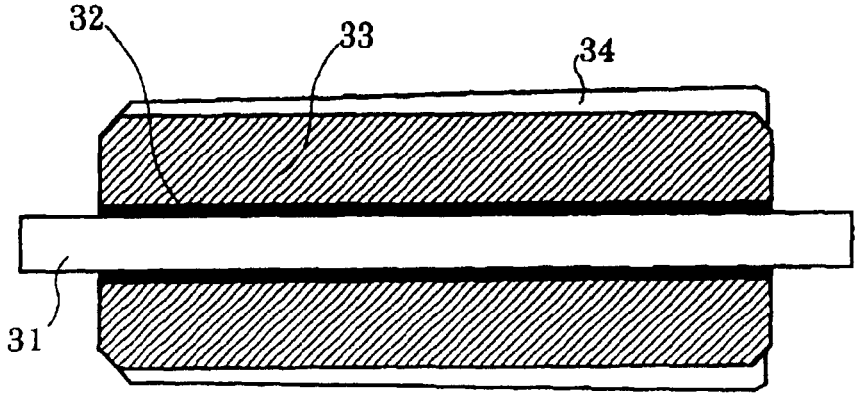
FIG. 23 is a schematic diagram of a charged roller used in a comparative example.

FIG. 23 is a schematic diagram showing the charged roller used as a comparative example. In FIG. 23, the charged roller has a configuration as follows.

(A) An electro-conductive adhesive 32 is applied around a conductive shaft 31.

(B) An elastic layer 33 consisting of urethane rubber that is adjusted to be semi-conductive by the ion conduction is provided cylindrically around the conductive adhesive 32.

(C) The surface of the elastic layer 33 is coated by a surface layer 34 made of urethane resin adjusted to be semi-conductive by the electroconductive carbon, and being thin at the anti-gear side.

Figure 24:
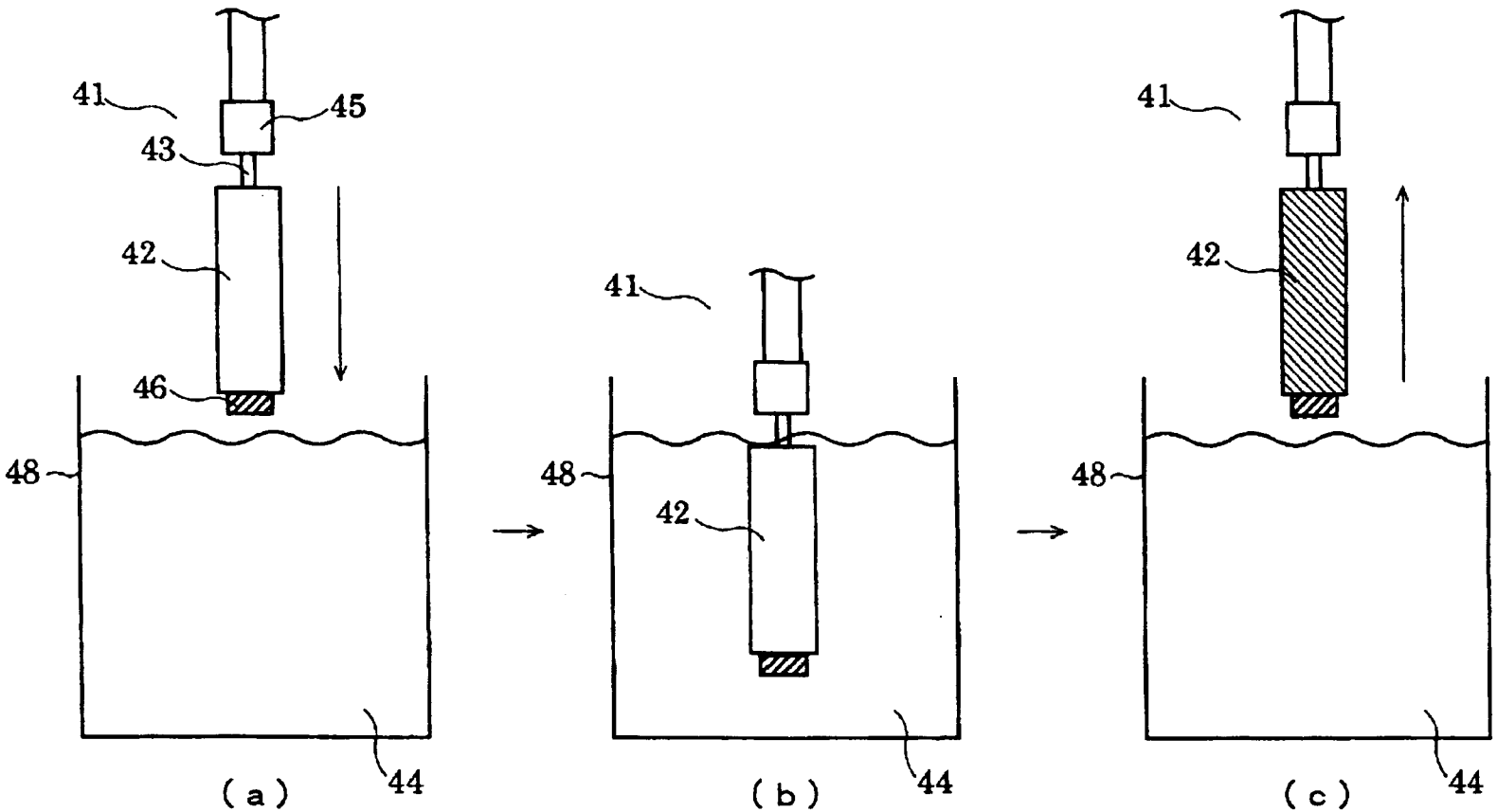
FIG. 24 is a schematic illustration of steps of a dipping method for coating isocyanate or urethane.
Figure 25:
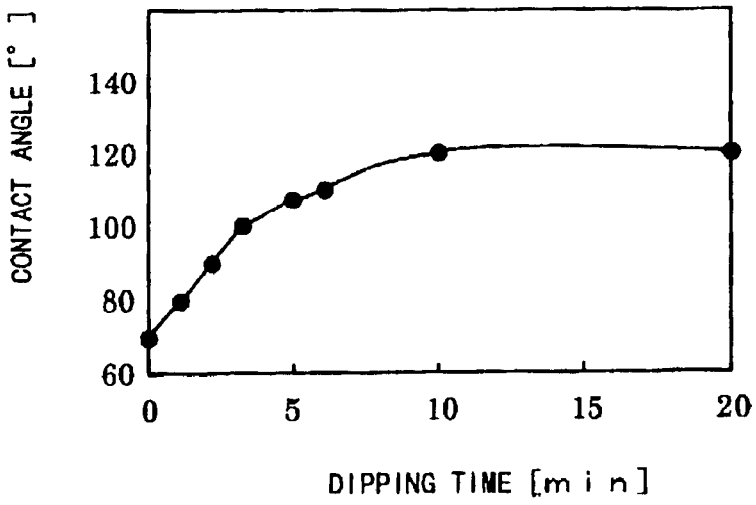
FIG. 25 presents graphical data showing a relationship between an immersing time in an isocyanate solution and a contact angle of a charged roller.

FIG. 24 is a schematic diagram illustrating the step of coating isocyanate or urethane resin described above, using a dipping system. In this figure, a rubber roller 42 consisting of a rubber elastic layer alone is connected to a coating device 41 having a lifting chuck 45 at one end of a shaft 43, and being able to move up and down. The rubber roller 42 has a protective cover 46 at a part (lower end) of the shaft 43 entering a coating solution 44 in a tank 48.

The coating device immerses the rubber elastic layer 42 in the coating solution 44 keeping the chuck 45 above the solution. Then the coating device lifts the rubber elastic layer 42 at a constant rate, applying the coating solution 44. In such a charged roller used in the comparative example of this invention, the rubber elastic layer 42 is made of urethane, and the coating solution 44 is a nylon resin or urethane resin adjusted to a constant viscosity by solvents.

On the other hand in the embodiment of this invention, the rubber elastic layer 42 is made of epichlorohydrin rubber, and the coating solution 44 is an isocyanate solution adjusted to a constant concentration by solvents. In this case, the viscosity of isocyanate solution in the tank 48 is adjusted enough to be lower than nylon resin solution or urethane resin solution. This is because when isocyanate solution is laminated onto the surface of the rubber elastic layer 42, an electrically insulating layer of isocyanate generates insufficient electrification. For this reason, isocyanate solution does not generate a liquid dropping, resulting in a small amount of deposition on the surface of the rubber elastic layer 42, homogeneously without dependency on the lifting direction.

Isocyanate solution deposited on the surface is heated after this coating step, then almost being incorporated (setting of the isocyanate) into rubber molecules of the epichlorohydrin rubber. In other words, this embodiment of the invention is characterized by not having a conventional surface layer, but has appropriate electrical-insulation or water repellency due to setting of the isocyanate in molecules of the epichlorohydrin rubber. And this invention changes the water repellency of the surface by charging the time or impregnation in the isocyanate solution.

The contact angle of the charged roller made by the above-described method is measured by using the contact angle measuring equipment FACE CA-S, roller type, manufactured by Kyowa Kaimen Kagaku Co., Ltd. Pure water is used as a measuring liquid. Droplet size before dropping is 2 mm, and it is measured 10 seconds after dropping on the subject to obtain determinations. It is found that the longer is the impregnation time, the larger is the contact angle (the better is the water repellency).

Next, the method of preparing the toner used in the invention is explained. The following mixture is put into an attritor ("MA-01SC" manufactured by Mitsui Miike Engineering Corp.) and disperses at 15° C. for 10 hours, to prepare a polymerizable composition.

Component of Mixture

Styrene: 67.5 parts by weight n-butyl acrylate: 32.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water is added to the mixture to prepare a dispersion medium for polymerization. The polymerizable composition is added to the dispersion medium and disperses at 15° C. for 10 minutes at a rate of 8,000 rpm in a TK homomixer ("M Type" manufactured by Tokusyu Kika Kogyo Co., Ltd.). The resultant dispersion is put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 9.5 parts by weight of methyl methacrylate, 0.5 part by weight of n-butyl acrylate, 0.5 part by weight of 2,2'-azo bis-isobutyronitrile, 0.1 part by weight of sodium laurylsulfate, and 80 parts by weight of water are mixed to obtain an aqueous emulsion A, four parts by weight of which are dripped into the aqueous suspension of the intermediate particles to swell the particles. Just after dripping, when observing the aqueous suspension with an optical microscope, no droplets of the emulsion are visible. It is therefore confirmed that the swelling has occurred within a very short time.

The suspension is further reacted as the second polymerization at 85° C. for 10 hours under a nitrogen atmosphere with stirring. After cooling, the dispersion medium is dissolved with a 0.5 N aqueous hydrochloride acid solution and the mixture is filtrated. The residue thus obtained is washed with water, air-dried, dried at 40° C. for 10 hours under a reduced pressure of 10 mm Hg, and classified by air classifier to obtain a capsulated toner having an average particle diameter of 7 μm.

0.35 parts by weight of a fine powder of a hydrophobic silica "Aerosil R-972" (manufactured by Japan Aerosil Co., Ltd.) is mixed with 50 parts by weight of the resultant capsulated toner to obtain the capsulated toner of the present invention. A Tg of the resin originated from the core of the capsulated toner of the invention is 35° C. A Tg of the thermoplastic resin obtained by polymerization of the aqueous emulsion A alone is 95° C. In other words, a Tg of the resin originated from the shell may be considered to be 95° C.

In this invention, the composition ratio of styrene and n-butyl acrylate is varied to prepare toners in which the Tgs of the core are different. This invention prepares samples having different Tgs of the core from 35° C. to 85° C. Furthermore, this invention also includes a single-layer toner without shells.

The following is a method of preparing the single-layer toner. The following mixture is put into an attritor ("MA-01SC" manufactured by Mitsui Miike Engineering Corp.) and disperses at 15° C. for 10 hours, to prepare a polymerizable composition.

Component of Mixture

Styrene: 67.5 parts by weight n-butyl acrylate: 32.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water is added to the mixture to prepare a dispersion medium for polymerization. The polymerizable composition is added to the dispersion medium and disperses at 15° C. for 10 minutes at a rate of 8,000 rpm in a TK homomixer ("M Type" manufactured by Tokusyu Kika Kogyo Co., Ltd.).

Next, the resultant dispersion is put into a separable one liter flask and reacted at 85° C. for 12 hours under a nitrogen flow with stirring at a rate of 100 rpm. After cooling, the dispersion medium is dissolved with a 0.5 N aqueous hydrochloride acid solution and the mixture is filtrated. The residue thus obtained is washed with water, air-dried, dried at 20° C. for 20 hours under a reduced pressure of 10 mm Hg, and classified by air classifier to obtain a capsulated toner having an average particle dimension of 7 μm.

0.35 parts by weight of a fine powder of a hydrophobic silica "Aerosil R-972" (manufactured by Japan Aerosil Co., Ltd.) is mixed with 50 parts by weight of the resultant capsulated toner to obtain the capsulated toner of the present invention. A Tg of the toner is 35° C. Single-layer toner having different Tgs also can be prepared by varying the composition ratio of styrene and n-butyl acrylate similarly to the capsulated toner. Also samples of the single-layer toner having different Tgs from 35 to 85° C. were prepared according to this invention.

Embodiment 5

Figure 28:
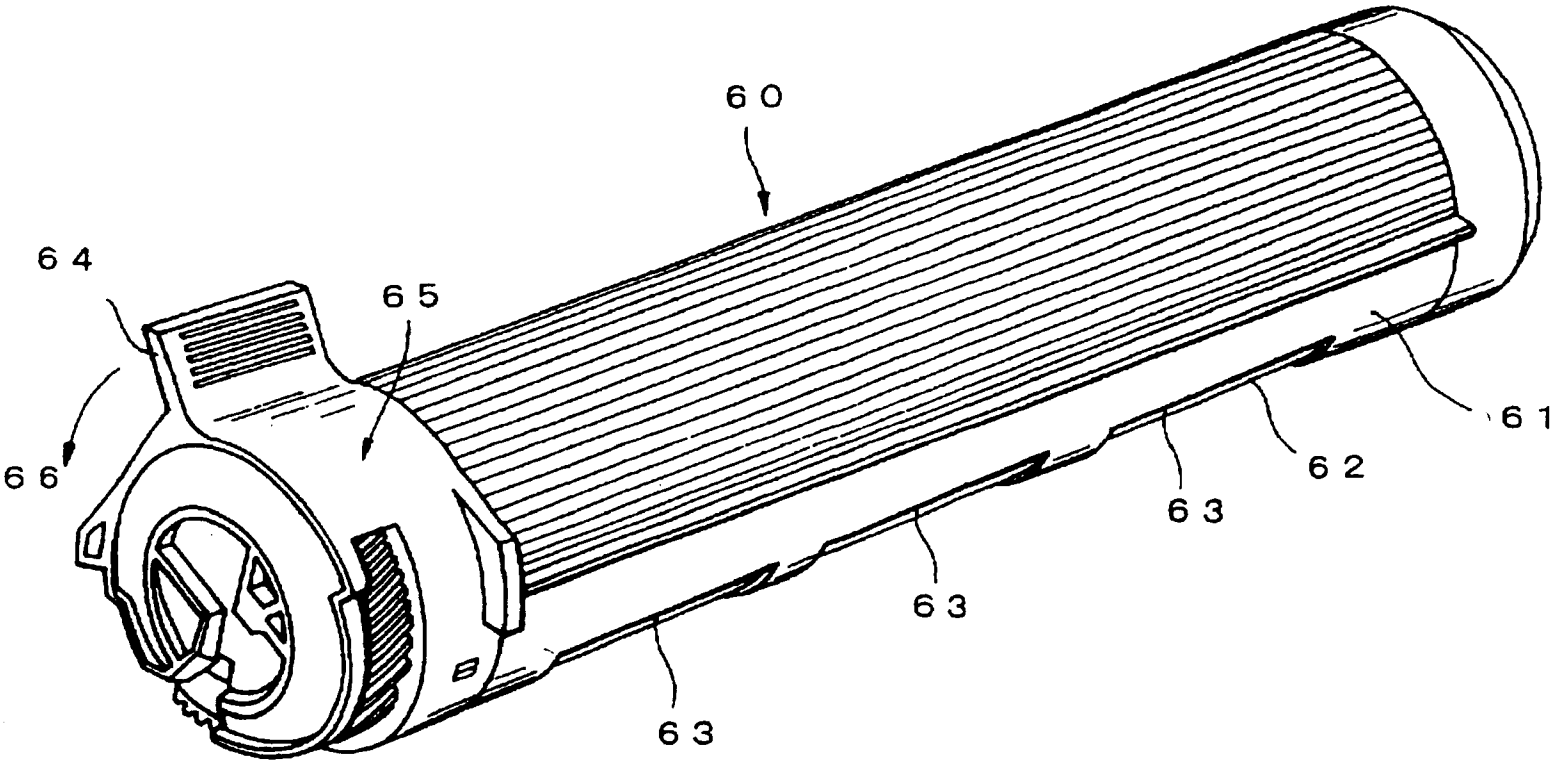
FIG. 28 is a perspective view of a toner cartridge in which the toner of this invention is stored.

FIG. 28 is perspective view of a toner cartridge in which the toner of this invention explained heretofore is stored.

The body of this toner cartridge 60 is composed of an outer barrel 61 and an inner barrel 62. Three ejection gates 63 are opened on the side wall of the outer barrel 61. The same layout ejection gates which are not illustrated in the figure, are opened on the side wall of the inner barrel 62. The ejection gates are positioned at the corresponding position of the outer barrel 61.

The toner is stored in the inner barrel 62. At the left side of the inner barrel 62, a cap 65 with a tab 64 is fixed. The right side of the inner barrel 62 and the right side of the outer barrel 61 are covered with a wall, (not illustrated in the figure). Holding the outer barrel 61 so as not to rotate, when the tab 64 of the cap 65 is pushed to the direction of the arrow 66, the inner barrel 62 rotates inside the outer barrel 61. Rotating the inner barrel 62 to a certain angle, the ejection gates of the inner barrel 62 and the ejection gates 63 of the outer barrel 61 are directly rapped over. Then the toner is available to eject through the gates from the inner barrel 62 to outside.

When the toner cartridge is transported or deposited, the wall of the inner barrel 62 shuts the ejection gate 63 of the outer barrel 61, as illustrated in the figure. The toner of the invention can be preserved for a long time by storing in such a toner cartridge.

Figure 29:
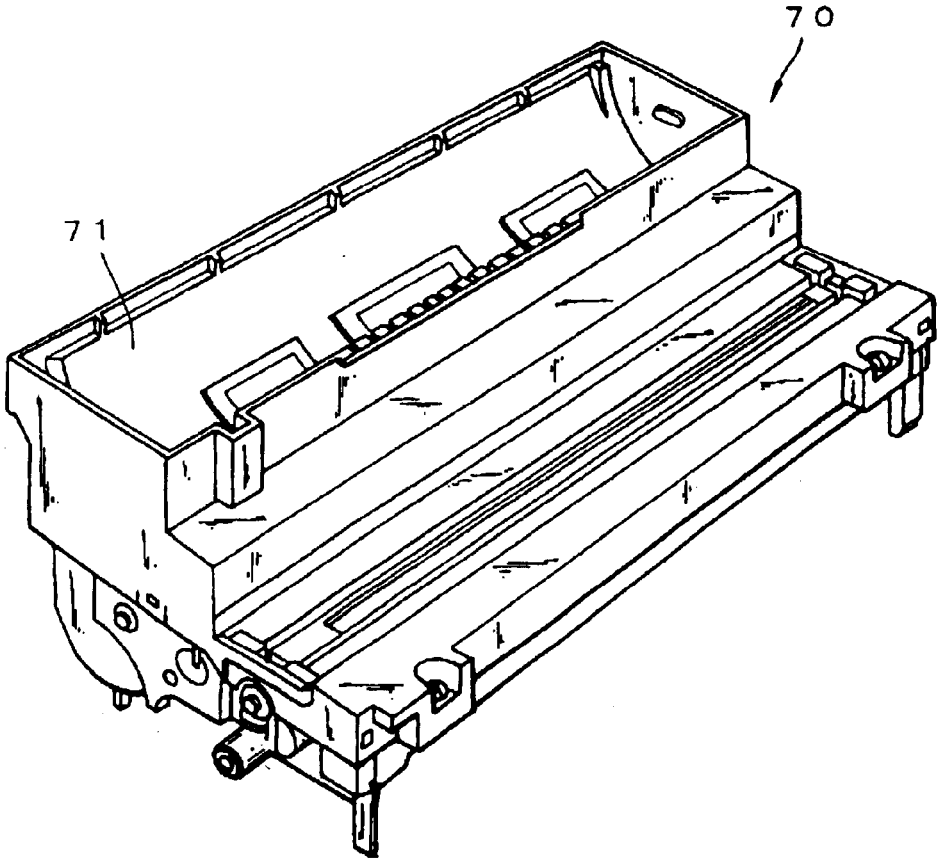
FIG. 29 is a perspective view of a print engine for mounting the toner cartridge.

FIG. 29 is a perspective view of a print engine for mounting the toner cartridge. The print engine 70 has a developing unit 71. Facing the ejection gate 12 downward, the toner cartridge 60 is fixed on the developing unit 71.

On the developing unit 71, the outer barrel 61 of the toner cartridge 60 is fixed so as not to rotate. Adding rotation to the tab 64 in this status, the toner is available for supply to the developing unit from the inner barrel 62. In such a print engine, the toner of this invention is supplied for high speed printing.

EXAMPLES

The present invention will be illustrated hereinbelow by examples, comparative examples or test examples thereof, which are not intended to place any limitation on the invention. The invention is illustrated by the following examples.

Examples and Comparative Examples of Embodiment 1

Example 1

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 2 parts by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 9.25 parts by weight of methyl methacrylate, 0.75 part by weight of n-butyl acrylate, 0.5 part by weight of 2,2'-azo bis-isobutyronitrile, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. Nine parts by weight of the aqueous emulsion A was dripped into the aqueous suspension of the intermediate particles to swell the particles. Just after dripping, observing the aqueous suspension with an optical microscope, no droplets of the emulsion were visible. It was therefore confirmed that the swelling had occurred within a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm.

A Tg of resin particles obtained before seed polymerization was 55° C. In other words, a Tg of the resin originated from the core of the capsulated toner of the invention may be considered to be 55° C. Then, a Tg of the thermoplastic resin obtained by polymerization of the aqueous emulsion A alone was 85° C. In other words, a Tg of the resin originated from the shell may be considered to be 85° C. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention.

The toner was packed into the imaging apparatus having the configuration illustrated in FIG. 1 (EP cartridge), and continuous printing was performed on A4 size paper. The PRINTING DUTY was 10%. As shown in FIG. 4, the background fog was extremely reduced from that of the initial printing, to obtain prints of high printing quality. As shown in FIG. 6, the charge level of the developing roller was stable at 11 μc/g, and a development to the background did not occur.

Example 2

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 9.25 parts by weight of methyl methacrylate, 0.75 part by weight of n-butyl acrylate, 0.5 part by weight of 2,2'-azo bis-isobutyronitrile, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. Nine parts by weight of the aqueous emulsion A was dripped into the aqueous suspension of the intermediate particles to swell the particles. Just after dripping, observing the aqueous suspension with an optical microscope, no droplets of the emulsion were visible. It was therefore confirmed that the swelling had occurred within a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm.

A Tg of resin particles obtained before seed polymerization was 55° C. In other words, a Tg originated from the core of the capsulated toner of the invention may be considered to be 55° C. Then, a Tg of the thermoplastic resin obtained by polymerization of the aqueous emulsion A alone was 85° C. In other words, a Tg of the resin originated from the shell may be considered to be 85° C. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention (toner C).

The toner was packed into the imaging apparatus having the configuration illustrated in FIG. 1 (EP cartridge), and continuous printing was performed on A4 size paper. The PRINTING DUTY was 10%. As shown in FIG. 4, the background fog was much better than that of the initial printing, so prints of high printing quality were obtained. As shown in FIG. 6, the charge level of the developing roller was stable at 11 μc/g, and a development to the background did not occur.

Comparative Example 1

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 0.2 parts by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 9.25 parts by weight of methyl methacrylate, 0.75 part by weight of n-butyl acrylate, 0.5 part by weight of 2,2'-azo bis-isobutyronitrile, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. Nine parts by weight of the aqueous emulsion A was dripped into the aqueous suspension of the intermediate particles to swell the particles. Just after dripping, upon observing the aqueous suspension with an optical microscope, no droplet of the emulsion was visible. It was therefore confirmed that the swelling had occurred in a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm.

A Tg of resin particles obtained before seed polymerization was 55° C. In other words, a Tg of the resin originated from the core of the capsulated toner of the invention may be considered to be 55° C. Then, a Tg of the thermoplastic resin obtained by polymerization of the aqueous emulsion A alone was 85° C. In other words, a Tg of the resin originated from the shell may be considered to be 85° C. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention (toner A).

The toner was packed into the imaging apparatus having the configuration illustrated in FIG. 1 (EP cartridge), and continuous printing was performed on A4 size paper. The PRINTING DUTY was 10%. As shown in FIG. 4, the background fog was bad (like 15%), and thereafter it improved with printing, but more than 500 prints were required to obtain improvement. Corresponding to these results, the initial charge level of the developing roller was low at 4 μc/g.

Comparative Example 2

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 2 parts by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm.

After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention (toner J).

The toner was packed into the imaging apparatus having the configuration illustrated in FIG. 1 (EP cartridge), and continuous printing was performed on A4 size paper. The PRINTING DUTY was 10%. As shown in FIG. 4, although the background fog was extremely good, the phenomenon that toner was developed on the background (non-printing area) occurred with printing. This phenomenon was confirmed after 500 prints under the environment of 25° C. and 55% humidity, and at this time the charge of the developing roller was at a high level of 20 μc/g, and the charge level of the developing roller after 1000 prints was elevated towards 21 μc/g.

Examples and Comparative Examples of Embodiment 2

Example 1

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 9.25 parts by weight of methyl methacrylate, 0.75 part by weight of n-butyl acrylate, 0.5 part by weight of 2,2'-azo bis-isobutyronitrile, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. Nine parts by weight of the aqueous emulsion A was dripped into the aqueous suspension of the intermediate particles to swell the particles. Just after dripping, observing the aqueous suspension with an optical microscope, no droplets of the emulsion were visible. It was therefore confirmed that the swelling had had occurred within a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm.

A Tg of resin particles obtained before seed polymerization was 55° C. In other words, a Tg originated from the core of the capsulated toner of the invention may be considered to be 55° C. Then, a Tg of the thermoplastic resin obtained by polymerization of the aqueous emulsion A alone was 85° C. In other words, a Tg of the resin originated from the shell may be considered to be 85° C. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention. The toner had a volume intrinsic electrical resistivity log p of 11.5. The was packed into the imaging apparatus having the configuration illustrated in FIG. 1 (EP cartridge), and then the surface potential Vp1 of the photoreceptor drum was measured to be −800 V, and prints of high printing quality could be obtained. There was no change in the surface potential Vp1 after 30,000 prints were obtained on A4 size paper, and prints were of a high printing quality similar to those obtained in the initial printing.

Next, the toner was packed into the LED Printer [OKI MIKRONE] *OKI MICROLINE* 16n to print, and then a fixation percentage was measured. The temperature of the heat roller of the fixation device was set at 130° C.

The fixation percentage is defined by the follow equation:

Fixation Percentage (%)=(image density after rubbing/image density before rubbing)×100

The term "image density before rubbing" means the image density of a solid color print, measured by a Macbeth densitometer. The term "image density after rubbing" means the image density retained on a print after Scotch-tape is overlaid on the solid color print, and a load of 50 g/cm$^2$ is applied to a given area by reciprocation and removed from the print at a rate of 3 cm/sec. The capsulated toner of this example indicates an extremely good fixation of 99% or more.

A blocking resistance of the toner was determined by the following method. A cylindrical container having a bottom of 20 cm$^2$ was charged with 20 grams of the toner sample, capped and given a pressure of 500 g/cm$^2$ by weight. The toner was kept at 50° C. in this condition for a month. All of the sample toner (20 g) was transferred onto a sieve of 45 μm mesh, vibrated at a rate of 1 KHz for 30 seconds and then the toner retained on the sieve was weighted. A blocking property (%) is defined by the following equation.

Blocking percentage (%)=Weight of toner retained on sieve (g)/Weight of sample toner (g)×100

The capsulated toner of this example had a blocking percentage of zero and indicated very good stability. As a result of mentioned above, a revolutionary imaging apparatus, which produces prints of extremely high printing quality from initial printing and through continuous printing, indicates good fixability even at a low temperature of the fixation device, and has extremely good high-temperature stability, may be provided in a electrophotographic process without ozone generation (and without waste toner generation) by using the capsulated toner having the intrinsic volume resistivity obtained in the example within the imaging apparatus of the contact charged system (accompanying the toner recycle system).

Example 2

Ninety parts by weight of methyl methacrylate, 10 parts by weight of n-butyl acrylate, 3 parts by weight of 2,2'-azo bis-isobutyronitrile were entered in a two liter glass 4-necked flask equipped with a thermometer, a stainless-steel stirring bar, a continuous flow condenser, and nitrogen introduction tube, then reacted in a mantle heater at 100° C. under a nitrogen flow. Samples were collected during polymerization reaction whenever necessary to measure the Tg. When the Tg of a polymerization product reached 60° C., the reaction was stopped. Tgs were measured by a differential scanning calorimeter ("DSC 220 type" manufactured by Seiko Electronic Industry Co., Ltd.). This product was named resin B. It was confirmed that the Tg of the polymerization product that was obtained after a sufficient prolonged reaction time of this polymerization was 90° C.

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Resin B mentioned above: 0.25 part by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, the aqueous suspension of said intermediate particles was added to a same volume of the aqueous emulsion A used in Example 1, and treatments after that were performed according to Example 1. The toner had a volume intrinsic electrical resistivity log ρ of 11.3.

The toner was packed into the imaging apparatus having the configuration illustrated in FIG. 12 (EP cartridge), then the surface potential Vp1 of the photoreceptor drum thus measured was −800 V, and prints of high printing quality could be obtained. There was no change in the surface potential Vp1 after continuous printing of 30,000 prints on A4 size paper to obtain high quality prints similar to those obtained in the initial printing.

Next, the toner was packed into the LED Printer [OKI MIKRONE] *OKI MICROLINE* 16n to print, then a fixation percentage was measured under the same conditions as in Example 1. The capsulated toner of this example indicated an extremely good fixation of 99% or more.

The blocking percentage of the capsulated toner of this example was zero as in the case of Example 1. Based on the results mentioned above it is apparent that a revolutionary imaging apparatus, which produces prints of extremely high printing quality from initial printing through continuous printing, indicates good fixability even at a low temperature of the fixation device, and has extremely good high-temperature stability, may be provided in a electrophotographic process without ozone generation (and without waste toner generation) by using the capsulated toner having the intrinsic volume resistivity obtained in the example within the imaging apparatus of the contact charged system (accompanying the toner recycle system).

Example 3

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Resin B used in Example 2: 0.25 part by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 8 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, the aqueous suspension of said intermediate particles was added to a same volume of the aqueous emulsion A used in Examples 1 and 2 and treatments after that were performed according to Examples 1 and 2. The toner had a volume intrinsic electrical resistivity log ρ of 11.0.

The toner was packed into an imaging apparatus having the configuration illustrated in FIG. 12 (EP cartridge), and then the surface potential Vp1 of the photoreceptor drum Vp1 was measured to be −800 V, and prints of high printing quality could be obtained. There was no change in the surface potential Vp1 after continuous printing of 30,000 prints on A4 size paper to obtain prints of a high printing quality similar to those obtained in the initial printing.

Next, the toner was packed into the LED Printer OKI MIKRONE 16n to print, and a fixation percentage was measured under the same conditions as in Example 1. The capsulated toner of this example indicated an extremely good fixation of 99% or more.

The blocking percentage of the capsulated toner of this example was zero as in the case of Example 1. As a result, it is apparent from the above that a revolutionary imaging apparatus, which produces prints of extremely high printing quality from initial printing through continuous printing, indicates good fixability even at a low temperature of the fixation device, and has extremely good high-temperature stability, may be provided in a electrophotographic process without ozone generation (and without waste toner generation) by using the capsulated toner having the intrinsic volume resistivity obtained in the example within the imaging apparatus of the contact charged system (accompanying the toner recycle system).

Example 4

Toners used in Examples 1, 2 and 3 were packed into the imaging apparatus illustrated in FIG. 13, and then 50,000 prints were produced on A4 paper in a continuous run.

Just before the run of 50,000 prints, toner streaks appeared in part of the charged roller in an amount of 0.5 mg/cm$^2$. At this time, the edge portion of the cleaning blade counterpart (1102) (contact with the photoreceptor drum) became rounder, and it was confirmed that poor cleaning had occurred. However, it did not affect the quality of printing, and the surface potential of the photoreceptor drum did not decrease.

Comparative Example 1

The capsulated toner was prepared according to the above-described Example 3 except that 9 parts by weight of carbon black was used in the toner synthesis. The toner had a volume intrinsic electrical resistivity log ρ of 10.0. The toner was packed into the imaging apparatus having the configuration illustrated in FIG. 12 (EP cartridge), and the surface potential Vp1 of the photoreceptor drum thus measured was −650 V.

In this case, the toner was developed in part of the print background, so as not to obtain prints of satisfactory printing quality. The Vp1 was gradually decreased to −500 V after printing of approximately 100 prints. As this time, the development onto the background was so high that the printing could not be continued. It may be considered that toner deposition of 2 mg/cm$^2$ onto the charged roller at this time accelerated a drop of the electrification voltage.

Comparative Example 2

The following mixture was put into an attritor ("MA-01SC" manufactured by, Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 9.5 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion was put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 10 parts by weight of styrene, 0.5 part by weight of 2,2'-azo bis-isobutyronitrile, 0.1 part by weight of sodium laurylsulfate, and 80 parts by weight of water were mixed, and the mixture was treated by an ultrasonic generator ("US-150", Nippon Seiki Industry Co., Ltd.) to prepare aqueous emulsion C. Nine parts by weight of the aqueous emulsion C was dripped into the aqueous suspension of the intermediate particles to swell the particles. Just after the dripping, observing the aqueous suspension with an optical microscope, no droplets of the emulsion were visible. It was therefore confirmed that the swelling had occurred after a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm.

A Tg of resin particles obtained before seed polymerization was 55° C. In other words, a Tg originated from the core of the capsulated toner of the invention may be considered to be 55° C. Then, a Tg of the thermoplastic resin obtained by polymerization of the aqueous emulsion C alone was 100° C. In other words, a Tg of the resin originated from the shell may be considered to be 100° C.

0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention. The toner had a volume intrinsic electrical resistivity log ρ of 10.1.

The toner was packed into the imaging apparatus having the configuration illustrated in FIG. 12 (EP cartridge), the surface potential Vp1 of the photoreceptor drum was measured to be −800 V, and prints of high printing quality could be obtained. There was no change in the surface potential Vp1 after printing of 30,000 prints on A4 size paper and the prints had a high printing quality similar to that provided in the initial printing, and the fixation percentage was sufficient at 95% or more.

However, the blocking percentage was extremely bad, e.g. 55%. Then, it was confirmed that loading of 20 parts by weight of the aqueous emulsion C was necessary to make the blocking percentage zero. The fixation percentage at this time, however, was 45%. It was found that both fixability and high-temperature stability could not be obtained when the aqueous emulsion C was used.

Furthermore, toner was prepared as follows. The following mixture was put into an attritor ("MA-01SC" manufactured by Mitsui Miike Engineering Corp.) and dispersed at 15° C. for 10 hours, to prepare a polymerizable composition.

Component of Mixture

Styrene: 87.5 parts by weight n-butyl acrylate: 12.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion is put into a separable one liter flask and reacted at 85° C. for 12 hours under a nitrogen flow with stirring at a rate of 100 rpm. After cooling, the dispersion medium was dissolved with a 0.5 N aqueous hydrochloride acid solution and the mixture was filtrated.

The residue thus obtained was washed with water, air-dried, dried at 40° C. for 10 hours under a reduced pressure of 10 mm Hg by air classifier to obtain a capsulated toner having an average particle diameter of 7 μm. The Tg of the toner was 75° C. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention.

The fixation percentage of toner, that did not have a capsulate structure, was 45%. On the other hand, the blocking resistant percentage was zero. Then it was confirmed that a Tg of 75° C. or above was necessary to obtain the blocking resistance percentage of zero in toner prepared by this method. As a consequence, as between the capsulated toner in which 20 parts by weight of the aqueous emulsion C was added to ensure enough high-temperature stability, and the toner with Tg of 75° C., which does not have capsule fixability and high-temperature stability, the result was the same. Therefore, the capsulated toner using the aqueous emulsion C does not have an advantage in terms of a capsulate structure.

Example and Comparative Example of Embodiment 3

Example 1

The following mixture was put into an attritor ("MA-01SC" manufactured by Mitsui Miike Engineering Corp.) and dispersed at 15° C. for 10 hours, to prepare a polymerizable composition.

Component of Mixture

Styrene: 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water was added to the mixture to prepare a dispersion medium for polymerization. The polymerizable composition was added to the dispersion medium and disperses at 15° C. for 10 minutes at a rate of 8,000 rpm in a TK homomixer ("M Type" manufactured by Tokusyu Kika Kogyo Co., Ltd.). The resultant dispersion is put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 8.5 parts by weight of methyl methacrylate, 1.5 parts by weight of n-butyl acrylate, 0.5 part by weight of 2,2'-azo bis-isobutyronitrile as a polymerization initiator, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. Four parts by weight of the aqueous emulsion A was dripped into the aqueous suspension of the intermediate particles to swell the particles. Just after dripping, upon observing the aqueous suspension with an optical microscope, no droplet of the emulsion are visible. It was therefore confirmed that the swelling has occurred within a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention.

Next, the electrical resistivity (volume intrinsic electrical resistivity) of each material used for preparation of the toner, was measured. The intrinsic volume resistivity was measured by the dielectric loss meter type TR-10C manufactured by Ando Electrical Co., Ltd. at an oscillator frequency of 1 KHz after making measured samples of object material with a 3 g tablet compressing machine, and calculated as a logarithm using the equations below:

$$\log \rho = \log[(A/t)\times(1/Gx)]$$

log ρ: intrinsic volume resistivity (logarithm)

Gx: (Conductance ratio)×R

R: conductance measured value

A: area of electrode (11.34 $cm^2$)

t: thickness of samples (2 mm)

The carbon black used in this example had a log ρ of 6.2, and the charge control agent had a log ρ of 9.5. The resin obtained by polymerization of the aqueous emulsion A alone had a log ρ of 12.8. More specifically, the component that has the lowest electrical resistivity used for preparing toner was included in the core in this example.

The toner was packed into the LED Printer [OKI MIKRONE] *OKI MICROLINE* 16n for print, and a background fog on the photoreceptor drum and a blow-off charge level were measured under high temperature and high humidity (28° C., 80 RH %) and under low temperature and low humidity (10° C., 20 RH %).

A background fog on the photoreceptor drum was measured using a spectrophotometric calorimeter (CM-1000, manufactured by Minoruta Corp.). The fog is defined and measured as the difference between a reflectance of Scotch Tape (3M Corp.) as a reference and a reflectance of a sample, which transferred the fogging toner deposited on the photoreceptor drum to the tape.

A charge level was measured using blow-off charge level measuring equipment (manufactured by Toshiba Chemical Co., Ltd.), and including steps of sampling of 3 g of toner under various conditions, mixing it with 57 g of commercially available iron powder carrier, stirring in a ball mill for 10 minutes, and blowing the toner under an air pressure of 1 $kg/cm^2$. FIGS. 14 to 17 show the measurement results of Example 1. The toner prepared in Example 1 indicated a stable blow-off charge level during running, and under different environments produced a small background fog and was stable. FIGS. 18 to 21 show a blow-off charge level and a initial background fog on the photoreceptor drum when only loading of the aqueous emulsion A into the intermediate particles was varied under synthesis conditions of this example.

When the loading of aqueous emulsion A of below 0.1 part by weight or above 5 parts by weight, a fog under high temperature and humidity conditions was large, which allows the charge level to be low. As mentioned above, the reason for these results is considered to be that when a shell layer is absent or thin, a carbon black and a charge control agent which are polar material are exposed to the surface of the particles, thus causing a charge leak, whereas when a shell layer is too thick, the charge control agent in the core is not usefully active.

Example 2

One hundred parts by weight of methyl methacrylate and 3 parts by weight of 2,2'-azo bis-isobutyronitrile were entered in a two liter glass 4-necked flask equipment with a thermometer, a stainless-steel stirring bar, a continuous flow condenser, and nitrogen introduction tube, and then reacted in a mantle heater at 100° C. under a nitrogen flow. Samples were collected during the polymerization reaction whenever necessary to measure Tg. When the Tg of a polymerization product reached to 60° C., the reaction was stopped. Tgs were measured by a differential scanning calorimeter ("DSC 220 type" manufactured by Seiko Electronic Industry Co., Ltd.). This product was named resin B.

The following mixture was put into an attritor ("MA-01SC") manufactured by Mitsui Miike Engineering Corp.) and dispersed at 15° C. for 10 hours, to prepare a polymerizable composition.

Component of Mixture

Resin B above mentioned: 0.25 part by weight

Styrene 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen were dissolved in 180 parts by weight of ethanol. Six hundred parts by weight of distilled water was added to the mixture to prepare a dispersion medium for polymerization. The polymerizable composition was added to the dispersion medium and dispersed at 15° C. for 10 minutes at a rate of 8,000 rpm in a TK homomixer ("M Type" manufactured by Tokusyu Kika Kogyo Co., Ltd.). The resultant dispersion is put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 8.5 parts by weight of methyl methacrylate, 1.5 parts by weight of n-butyl acrylate, 0.5 part by weight of 2,2'-azo bis-isobutyronitrile as a polymerization initiator, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. Four parts by weight of the aqueous emulsion A was dripped into the aqueous suspension of the intermediate particles to swell the particles. Just after dripping, observing the aqueous suspension with an optical microscope, no droplet of the emulsion are visible. It was therefore confirmed that the swelling has occurred within a very short time.

The suspension was further reacted as the second polymerization at 85° C. for 10 hours in a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention.

The volume intrinsic electrical resistivity log ρ of the carbon black used in this example was 6.2, log ρ of the charge control agent was 9.5, and log ρ of the resin obtained by polymerization of the aqueous emulsion A alone was 12.8, and these were similar to Example 1. More specifically, the component that has the lowest electrical resistivity used for preparing toner was also included in the core in this example. The toner prepared in this example indicated a stable blow-off charge level during running, or under different environments produced a small background fog and was stable as in the case of Example 1.

Comparative Example 1

After preparing the intermediate particles by the same method as Example 1, the minute was cooled, and the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention.

The toner was packed into the LED Printer [OKI MIKRONE] *OKI MICROLINE* 16n to perform a continuous printing, and then measurements were taken of a background fog on the photoreceptor drum and of blow-off charge level, under high temperature and high humidity (28° C., 80 RH %) and under low temperature and low humidity (10° C., 20 RH %).

As results shown in FIGS. 14 to 17, electrifying property under high temperature and high humidity and that of under low temperature and low humidity different widely. While a large amount of fog appears under high temperature and high humidity, the phenomenon that the toner was developed onto the background appeared to have been owing to an excess charge level under low temperature and low humidity.

Comparative Example 2

The following mixture was put into an attritor ("MA-01SC" manufactured by Mitsui Miike Engineering Corp.) and dispersed at 15° C. for 10 hours, to prepare a polymerizable composition.

Component of Mixture

Styrene 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water was added to the mixture to prepare a dispersion medium for polymerization. The polymerizable composition was added to the dispersion medium and disperses at 15° C. for 10 minutes at a rate of 8,000 rpm in a TK homomixer ("M Type" manufactured by Tokusyu Kika Kogyo Co., Ltd.). The resultant dispersion is put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 8.5 parts by weight of methyl methacrylate, 1.5 parts by weight of n-butyl acrylate, 0.5 part by weight of 2,2'-azo bis-isobutyronitrile as a polymerization initiator, 0.1 part by weight of sodium laurylsulfate, and 80 parts by weight of water were mixed and the mixture was treated by an ultrasonic generator ("US-150", Nippon Seiki Industry Co., Ltd.) to prepare an aqueous emulsion A. 0.1 part by weight of the aqueous emulsion A was dripped into the aqueous suspension of the intermediate particles to swell the particles. Just after dripping, upon observing the aqueous suspension with an optical microscope, no droplets of the emulsion are visible. It was therefore confirmed that the swelling has occurred within a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm. 0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention.

The toner was packed into the LED Printer [OKI MIKRONE] *OKI MICROLINE* 16n to perform continuous printing. The toner prepared in this example resembled very closely in behavior the toner of Comparative example 1. More specifically, while a large amount of fog appeared under high temperature and high humidity, the phenomenon that the toner being developed onto the background appeared to be owing to excess an charge level under low temperature and low humidity.

Comparative Example 3

The toner was obtained by the same method of Comparative example 2 except that loading of the aqueous emulsion A used in Comparative example 2 was 10 parts by weight. The toner was packed into the LED Printer [OKI MIKRONE] *OKI MICROLINE* 16n to perform continuous printing.

The blow-off charge level of the toner prepared in this example was highly dependent on time, and a rising thereof was extremely slow. While in the toner prepared in Examples 1 and 2 and Comparative examples 1 and 2, the blow-off values 10 minutes after stirring were almost the same as that value after 30 minutes, in the toner of this example, the value after 10 minutes was 65% of the value after 30 minutes, indicating that rising of electrification was dull. Corresponding to this, the fog during initial printing was particularly large, and even though it improved with running, it would not be acceptable in practice.

Comparative Example 4

The following mixture was put into an attritor ("MA-01SC" manufactured by Mitsui Miike Engineering Corp.) and dispersed at 15° C. for 10 hours, to prepare a polymerizable composition.

Component of Mixture

Styrene 77.5 parts by weight n-butyl acrylate: 22.5 parts by weight

Low molecular weight polyethylene: 1.5 parts by weight (used as an offset preventing agent)

Charge control agent: 1 part by weight ("Aizensupiro black TRH" manufactured by Hodogaya Chemical Corp.)

Carbon black 7 parts by weight ("Printex L" manufactured by Degusa Co. Ltd.)

2,2'-Azo bis-isobutyronitrile 1 part by weight

Eight parts by weight of polyacrylate and 0.35 part by weight of divinylbenzen are dissolved in 180 parts by weight of ethanol. Six hundred parts by weight of distilled water was added to the mixture to prepare a dispersion medium for polymerization. The polymerizable composition was added to the dispersion medium and disperses at 15° C. for 10 minutes at a rate of 8,000 rpm in a TK homomixer ("M Type" manufactured by Tokusyu Kika Kogyo Co., Ltd.). The resultant dispersion is put into a separable one liter flask and reacted at 85° C. for 12 hours under a nitrogen flow with stirring at a rate of 100 rpm. The dispersoid obtained by polymerization of the polymerizable composition in these steps is referred to as "intermediate particles".

Next, 8.5 parts by weight of methyl methacrylate, 1.5 parts by weight of n-butyl acrylate, 0.5 part by weight of charge control agent of "Aizensupiro black TRH" manufactured by Hodogaya Chemical Corp., 0.5 part by weight of 2,2'-azo bis-isobutyronitrile as a polymerization initiator, 0.1 part by weight of sodium laurylsulfate, and 80 parts by weight of water were mixed and the mixture was treated by an ultrasonic generator ("US-150", Nippon Seiki Industry Co., Ltd) to prepare an aqueous emulsion A. Four parts by weight of the aqueous emulsion A was dripped into the aqueous suspension of the intermediate particles to swell the particles. Just after dripping, observing the aqueous suspension with an optical microscope, no droplets of the emulsion were visible. It was therefore confirmed that the swelling has occurred within a very short time.

The suspension was further reacted as the second polymerization at 85° C. for 10 hours under a nitrogen atmosphere with stirring. After cooling, the dispersion medium was dissolved with a 0.5 N aqueous hydrochloride acid solution and the mixture was filtrated. The residue thus obtained was washed with water, air-dried, dried at 40° C. for 10 hours under a reduced pressure of 10 mm Hg, and classified by air classifier to obtain a capsulated toner having an average particle diameter of 7 μm.

0.35 parts by weight of a fine powder of a hydrophobic silica "Aerosil R-972" (manufactured by Japan Aerosil Co., Ltd.) was mixed with 50 parts by weight of the resultant capsulated toner to obtain the capsulated toner of the present invention. When the toner was packed into the LED Printer [OKI MIKRONE] *OKI MICROLINE* 16n to perform continuous printing, a blow-off charge level was low, e.g. −30 μc/g, under a high temperature and a high humidity, and the background fog was large. On the contrary, a blow-off charge level was high, e.g. −120 μc/g, under a low temperature and a low humidity, and development onto the background occurred. It was found that when the charge control agent existed on the surface of the toner, the toner was very susceptible to environmental change, and has low practical utility.

Example and Comparative Example of Embodiment 4

Example 1

The isocyanate-treated charged roller, which used the capsulated toner having a Tg of the core of 35° C. and an immersing time of 10 minutes, was prepared. As shown in FIG. 6, the contact angle of the charged roller used for this example was 120°. EP cartridge shown in FIGS. 1 and 2 comprising the toner and the charged roller was set into the LED Printer [OKI MIKRONE] *OKI MICROLINE* 16n to perform continuous printing. The printing condition included use of A4 size paper and 15% of PRINTING DUTY.

Figure 26:
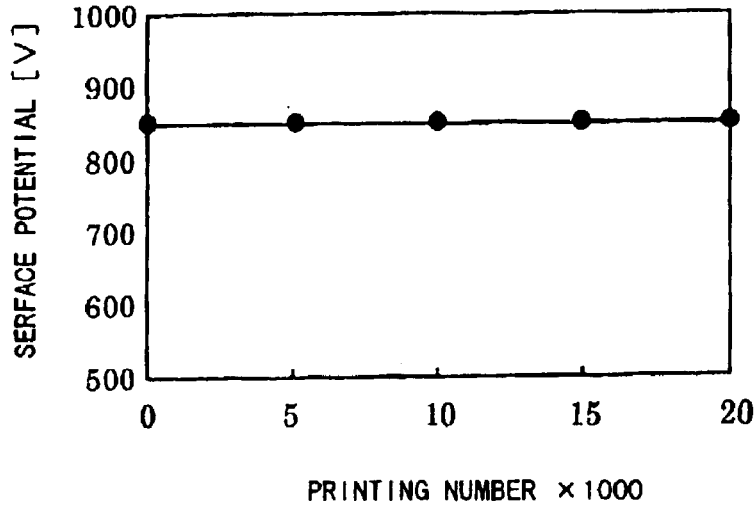
FIG. 26 presents graphical data showing a change of a surface potential of a photoreceptor drum against a number of prints.

FIG. 26 indicated the change of the surface potential of the photoreceptor drum against printing counts. In this example, the potential of the photoreceptor drum was much more stable than initially, and showed no change after a long time continuous printing. Therefore, as shown in Table 1, toner adhesive did not appear on the surface of the charged roller at all, which allowed the clean surface to be the same as the initial surface.

Next, similar continuous printing was conducted using the capsulated toner having a core Tg of 85° C. After 20,000 prints, the surface potential of the photoreceptor drum was as shown in Table 2, and the absence or presence of the toner adhesion on the surface of the charged roller is shown in Table 1. In this case, toner adhesive did not appear on the surface of the charged roller at all, which allowed the surface to remain clean, the same as the initial surface, and resembling the case where the toner had a core Tg of 35° C.

Furthermore, the single-layer toner without a shell, which had a Tg of from 35 to 85° C. was prepared in this example, and similar tests were performed. The results are shown in FIG. 27 as a relationship between Tg and contact angle.

As for toner having any Tg, a deposit of toner onto the charged roller did not appear, and the surface potential of the photoreceptor drum did not change before and after continuous printing, and the printing quality was extremely good, as in the case of the capsulated toner.

Example 2

The charged roller used in Example 1, the construction of which included immersion in isocyanate for 2 minutes, also was used in Example 2. The contact angle of the charged roller was 90°. The same test as was performed in Example 1 was conducted using this charged roller with capsulated toner and single-layer toner having the various Tgs. The results are shown in FIG. 27. In all of these tests, deposition of toner on the charged roller did not appear, and the surface potential of the photoreceptor drum was stable after continuous printing, and the printing quality was extremely good.

Furthermore, a charged roller, which had been immersed in isocyanate for 3 minutes and had a contact angle of 100°, was also prepared and assessed in a similar manner. In all of the tests for each of the toners, a deposit of toner onto the charged roller did not appear, and the surface potential of the photoreceptor drum after running was stable, and the printing quality was extremely good, as in the case of the charged roller having the 90° contact angle.

Comparative Example 1

A similar charged roller which was immersed in isocyanate for 1 minute, was prepared as in Example 1. The contact angle of the charged roller was 80°. The same tests as were performed in Example 1 were conducted using this charged roller in the capsulated toner and with the single-layer toner as prepared in Example 1, having the same various Tgs. The results are shown in FIG. 27.

In this example, although there was no difference between the capsulated toner and the single-layer toner in the test using the EP cartridge of the toner recycle system shown in FIG. 12, toner adhesion onto the charged roller depended on the Tg of the toner.

More specifically, with the system using the toner having the Tg below 60° C., the toner adhesion onto the charged roller after running, and a background phenomenon attendant upon it due to the reduced surface potential of the photoreceptor drum, were confirmed. The surface potential of the photoreceptor drum was decreased from −850 V to −650 V after 20,000 prints.

Then, in the test using the EP cartridge shown in FIG. 13, although insufficient cleaning of 0.5 mm width occurred after 20,000 prints, in the system using the toner having a Tg below 60° C., toner adhesion of the same width could be seen on the counterpart area of the surface of the charged roller in the longitudinal direction against the printing surface.

Comparative Example 2

The charged roller having a single layer of epichlorohydrin rubber that had not been immersed in isocyanate was prepared. The contact angle of the charged roller prepared in this example was 70°. The same test as in Example 1 was conducted using this charged roller and the capsulated toner and the single-layer toner prepared in Example 1 with the various Tgs. The results are shown in Table 1.

In this example, although there was no difference between the capsulated toner and the single-layer toner in the test using the EP cartridge of the toner recycle system shown in FIG. 12, toner adhesion onto the charged roller depended on the Tg of the toner. More specifically, in the system using the toner having a Tg below 65° C., toner adhesion onto the charged roller after running, and a background phenomenon attendant upon it due to the reduced surface potential of the photoreceptor drum, were confirmed. The surface potential of the photoreceptor drum was decreased from −850 V to −650 V after 20,000 prints.

Then, in a test using the EP cartridge shown in FIG. 13, although insufficient cleaning of 0.5 mm width occurred after 20,000 prints, in the system using the toner having a Tg below 65° C., toner adhesion of the same width could be seen on the counterpart area of the surface of the charged roller in the longitudinal direction against the printing surface.

Comparative Example 3

The charged roller having an elastic layer consisting of urethane rubber with the configuration shown in FIG. 23, was adjusted to be semi-conductive by ion conduction using the dipping apparatus illustrated in FIG. 24. The contact angle of the charged roller was 75°.

The same test as in Example 1 was conducted using this charged roller and the capsulated toner and the single-layer toner having various Tgs used in Example 1. The results are shown in FIG. 27.

In this example, although there was no difference between the capsulated toner and the single-layer toner in the test using the EP cartridge of toner recycle system shown in FIG. 12, toner adhesion onto the charged roller dependent on the Tg of the toner.

More specifically, with the system using the toner having a Tg below 65° C., the toner adhesion onto the charged roller after continuous printing, and a background phenomenon attendant upon it due to the reduced surface potential of the photoreceptor drum, were confirmed. The surface potential of the photoreceptor drum was decreased from −850 V to −650 V after 20,000 points.

Then, in the test using the EP cartridge shown in FIG. 13, although insufficient cleaning of 0.5 mm width occurred after 20,000 prints, in the system using the toner having a Tg below 65° C., toner adhesion of the same width could be seen on the counterpart area of the surface of the charged roller in the longitudinal direction against the printing surface.

What is claimed is:

1. An electrophotographic imaging apparatus with a one-element developing system, comprising:

a toner having a core and a shell layer enclosing the core, the core and the shell layer each comprising a composite resin having a Tg, wherein the lowest Tg among Tgs of the [composite] resins of the toner is below 60° C.;

an image carrier; and a member with high water repellency, contacting the image carrier to electrify the image carrier, wherein the water repellency of the member provides a contact angle of more than 90° with pure water.

2. An electrophotographic imaging apparatus with one-element developing system according to claim 1, further comprising a toner recycling system and a cleaning means that recovers a transferring residual toner, the toner recycling system recycling the transferring residual toner upon deposition of the toner on a latent image to form a toner image.

3. The toner cartridge wherein the toner according to claim 1 is stored.

4. The developing unit wherein the toner cartridge according to claim 3 is supplied.

5. An electrophotographic imaging apparatus with one-element developing system according to claim 1, wherein the toner has a blow-off charge level whose absolute value is at least 60 μc/g.

6. An electrophotographic imaging apparatus with one-element developing system according to claim 1, wherein the toner is a capsulated toner consisting of the core and the shell layer enclosing the core, wherein the core includes a charge control agent and the shell layer excludes any charge control agent.

7. An electrophotographic imaging apparatus with one-element developing system according to claim 1, wherein the toner is a capsulated toner consisting of the core and the shell layer enclosing the core, wherein the shell layer has between 0.1 and 4 parts of resin for each part of *the* resin in the core.

8. An electrophotographic imaging apparatus with one-element developing system according to claim 1, wherein the wherein the composite resin of the toner having the lowest Tg among Tgs is the composite resin of the core.

9. An electrophotographic imaging apparatus according to claim 1, wherein the contact angle is interior angle taken by a droplet of [pre] *pure* water on the member and is the angle of the tangent to the droplet with respect to the surface of the member, at a contacting edge between the droplet and the member.

10. An electrophotographic imaging apparatus as set forth in claim 9, wherein the size of the droplet is 2 mm before dropping the same on the member.

*11. An electrophotographic imaging apparatus with a one-element developing system, comprising:*

*a toner having a core and a shell layer enclosing the core, wherein the core comprises an easy-melting material and the shell layer comprise a hard-melting material;*

*an image carrier; and*

*a member with a high water repellancy that provides a contact angle of more than 90° with pure water.*

*12. An electrophotographic imaging apparatus with a one-element developing system, comprising:*

*a toner having a core and a shell layer enclosing the core, at least one of the core and the shell layer comprising a material having a glass transition temperature below 60° C.;*

*an image carrier; and*

*a member with a high water repellancy, contacting the image carrier to electrify the image carrier, wherein the water repellency of the member provides a contact angle of more than 90° with pure water.*

*13. An electrophotographic imaging apparatus with one-element developing system according to claim 12, further comprising a toner recycling system and a clearing means that recovers a transferring residual toner, the toner recycling system recycling the transferring residual toner upon deposition of the toner on a latent image to form a toner image.*

*14. The toner cartridge wherein the toner according to claim 12 is stored.*

*15. The developing unit wherein the toner cartridge according to claim 14 is supplied.*

*16. An electrophotographic imaging apparatus with one-element developing system according to claim 12, wherein the toner has a blow-off charge level whose absolute value is at least 60 μc/g.*

*17. An electrophotographic imaging apparatus with one-element developing system according to claim 12, wherein the toner is a capsulated toner consisting of the core and the shell layer enclosing the core, wherein the core includes a charge control agent and the shell layer excludes any charge control agent.*

*18. An electrophotographic imaging apparatus with one-element developing system according to claim 12, wherein the toner is a capsulated toner consisting of the core and the shell layer enclosing the core, wherein the shell layer has between 0.1 and 4 parts of resin for each part of resin in the core.*

*19. An electrophotographic imaging apparatus with one-element developing system according to claim 12, wherein the material of the core having the glass transition temperature is a resin.*

*20. An electrophotographic imaging apparatus according to claim 12, wherein the contact angle is an interior angle taken by a droplet of pure water on the member and is the angle of the tangent to the droplet with respect to the surface of the member, at a contacting edge between the droplet and the member.*

*21. An electrophotographic imaging apparatus as set forth in claim 20, wherein the size of the droplet is 2 mm before dropping the same on the member.*

*22. An electrophotographic imaging apparatus with a one-element developing system, comprising:*

*a toner having a core and a shell layer enclosing the core, wherein the core comprises an easy-melting material and the shell layer comprise a hard-melting material;*

*an image carrier; and*

*a member with a high water repellency contacting the image carrier to electrify the image carrier, wherein the water repellency of the member provides the member with a contact angle of more than 90° with pure water.*

* * * * *